(12) United States Patent
Jang et al.

(10) Patent No.: US 12,003,835 B2
(45) Date of Patent: Jun. 4, 2024

(54) CAMERA ACTUATOR

(71) Applicant: LG INNOTEK CO., LTD., Seoul (KR)

(72) Inventors: Young Bae Jang, Seoul (KR); Seong Min Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 192 days.

(21) Appl. No.: 17/629,231

(22) PCT Filed: Jul. 22, 2020

(86) PCT No.: PCT/KR2020/009640
§ 371 (c)(1),
(2) Date: Jan. 21, 2022

(87) PCT Pub. No.: WO2021/015545
PCT Pub. Date: Jan. 28, 2021

(65) Prior Publication Data
US 2022/0272238 A1 Aug. 25, 2022

(30) Foreign Application Priority Data

Jul. 23, 2019 (KR) .................... 10-2019-0089227
Jul. 29, 2019 (KR) .................... 10-2019-0091917

(51) Int. Cl.
*H04N 23/54* (2023.01)
*H04N 23/51* (2023.01)
*H04N 23/55* (2023.01)

(52) U.S. Cl.
CPC ............. *H04N 23/54* (2023.01); *H04N 23/51* (2023.01); *H04N 23/55* (2023.01)

(58) Field of Classification Search
CPC ......... H04N 23/51; H04N 23/54; H04N 23/55
USPC ..................................................... 348/207.99
See application file for complete search history.

(56) References Cited

U.S. PATENT DOCUMENTS

| | | | |
|---|---|---|---|
| 7,548,257 | B2 | 6/2009 | Ito et al. |
| 8,027,579 | B2 | 9/2011 | Takizawa et al. |
| 9,258,486 | B2 | 2/2016 | Hu et al. |
| 10,197,891 | B2 | 2/2019 | Rho et al. |
| 10,334,146 | B2 | 6/2019 | Im et al. |
| 10,488,631 | B2 | 11/2019 | Bachar et al. |

(Continued)

FOREIGN PATENT DOCUMENTS

| | | |
|---|---|---|
| CN | 101004534 A | 7/2007 |
| CN | 101666354 A | 3/2010 |

(Continued)

OTHER PUBLICATIONS

International Search Report (PCT/ISA/210) issued in PCT/KR2020/009640 dated Oct. 30, 2020.

*Primary Examiner* — Joel W Fosselman
(74) *Attorney, Agent, or Firm* — Birch, Stewart, Kolasch & Birch, LLP

(57) ABSTRACT

A camera actuator according to an embodiment includes a housing; a prism unit disposed in the housing; and a driving unit for tilting the prism unit, wherein a ball bearing and a pulling magnet for generating attractive force to each other are disposed in the prism unit and the housing, and wherein the prism unit is supported to the housing by the attractive force between the ball bearing and the pulling magnet.

18 Claims, 35 Drawing Sheets

(56) References Cited

U.S. PATENT DOCUMENTS

| | | |
|---|---|---|
| 10,516,773 B2 | 12/2019 | Yoon et al. |
| 10,534,194 B2 | 1/2020 | Lee et al. |
| 10,594,911 B2 | 3/2020 | Im et al. |
| 10,678,062 B2 | 6/2020 | Im et al. |
| 10,866,430 B2 | 12/2020 | Kim et al. |
| 11,150,447 B2 | 10/2021 | Bachar et al. |
| 11,277,550 B2 | 3/2022 | Im et al. |
| 11,650,400 B2 | 5/2023 | Bachar et al. |
| 2007/0133091 A1 | 6/2007 | Ito et al. |
| 2010/0202766 A1 | 8/2010 | Takizawa et al. |
| 2018/0059512 A1 | 3/2018 | Rho et al. |
| 2018/0364450 A1* | 12/2018 | Lee ............... H04N 23/55 |
| 2018/0367714 A1 | 12/2018 | Im et al. |
| 2019/0049687 A1 | 2/2019 | Bachar et al. |
| 2019/0121103 A1 | 4/2019 | Bachar et al. |
| 2019/0268515 A1 | 8/2019 | Im et al. |
| 2020/0174270 A1 | 6/2020 | Enta et al. |
| 2020/0177778 A1 | 6/2020 | Im et al. |
| 2021/0341713 A1 | 11/2021 | Bachar et al. |
| 2022/0159155 A1 | 5/2022 | Im et al. |

FOREIGN PATENT DOCUMENTS

| | | |
|---|---|---|
| CN | 101772730 A | 7/2010 |
| CN | 101666354 B | 3/2012 |
| CN | 103926780 A | 7/2014 |
| CN | 107786795 A | 3/2018 |
| CN | 107925717 A | 4/2018 |
| CN | 207424496 U | 5/2018 |
| CN | 109143528 A | 1/2019 |
| CN | 109151263 A | 1/2019 |
| CN | 208752290 U | 4/2019 |
| JP | 2015-11353 A | 1/2015 |
| JP | 2018-205683 A | 12/2018 |
| KR | 10-2011-0040740 A | 4/2011 |
| KR | 10-2017-0076123 A | 7/2017 |
| KR | 10-2018-0041040 A | 4/2018 |
| KR | 10-2018-0092251 A | 8/2018 |
| KR | 10-1942743 B1 | 1/2019 |
| KR | 10-1973434 B1 | 4/2019 |
| WO | WO 2010/010712 A1 | 1/2010 |

\* cited by examiner

[FIG. 1]
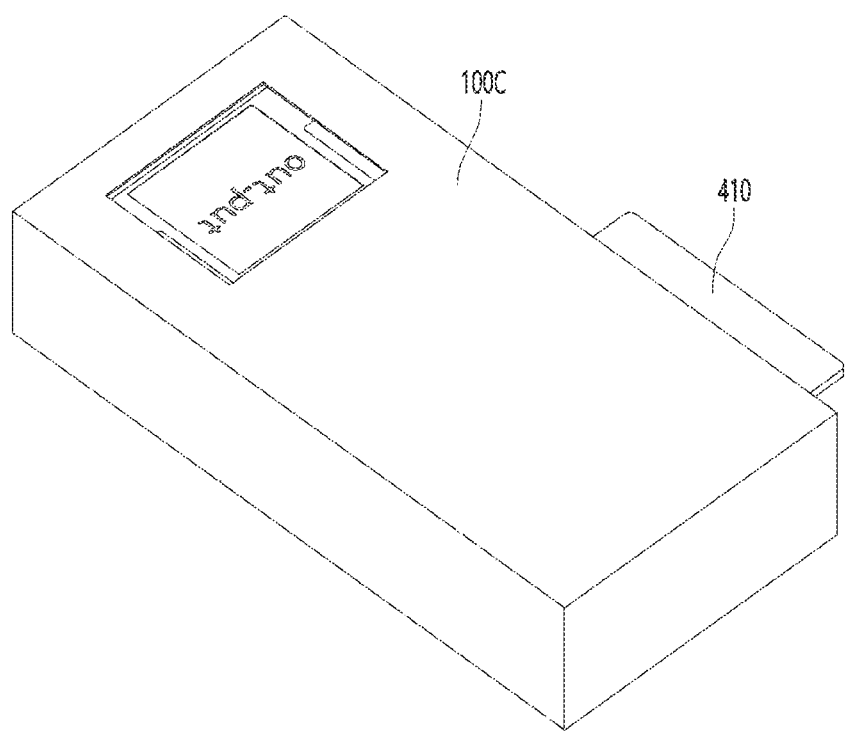

[FIG. 2a]
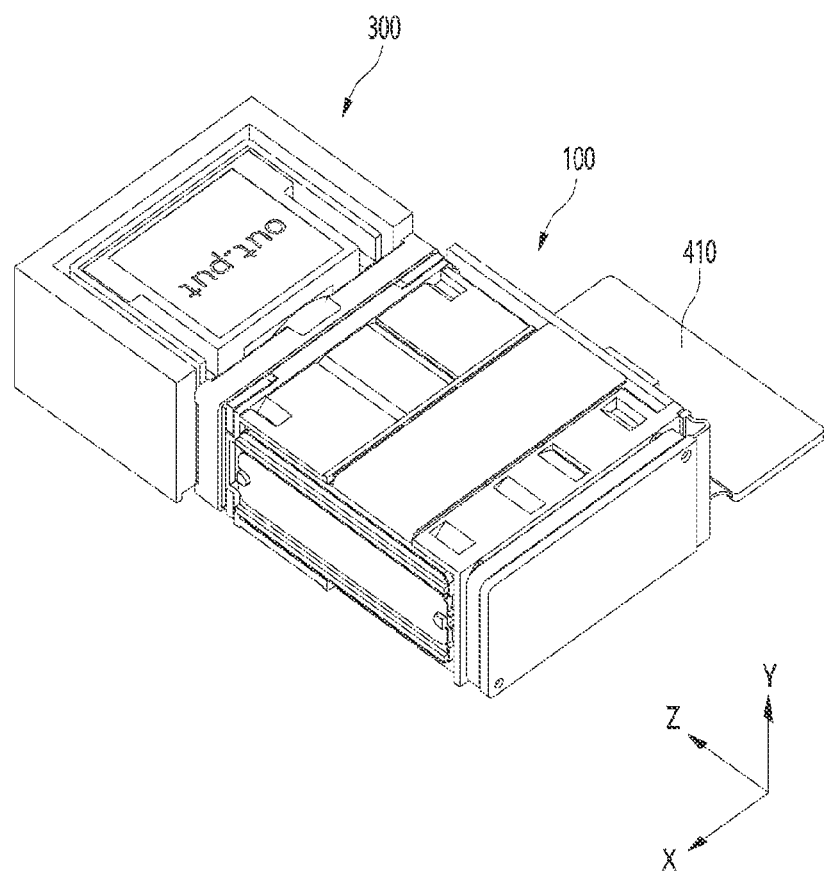

[FIG. 2b]
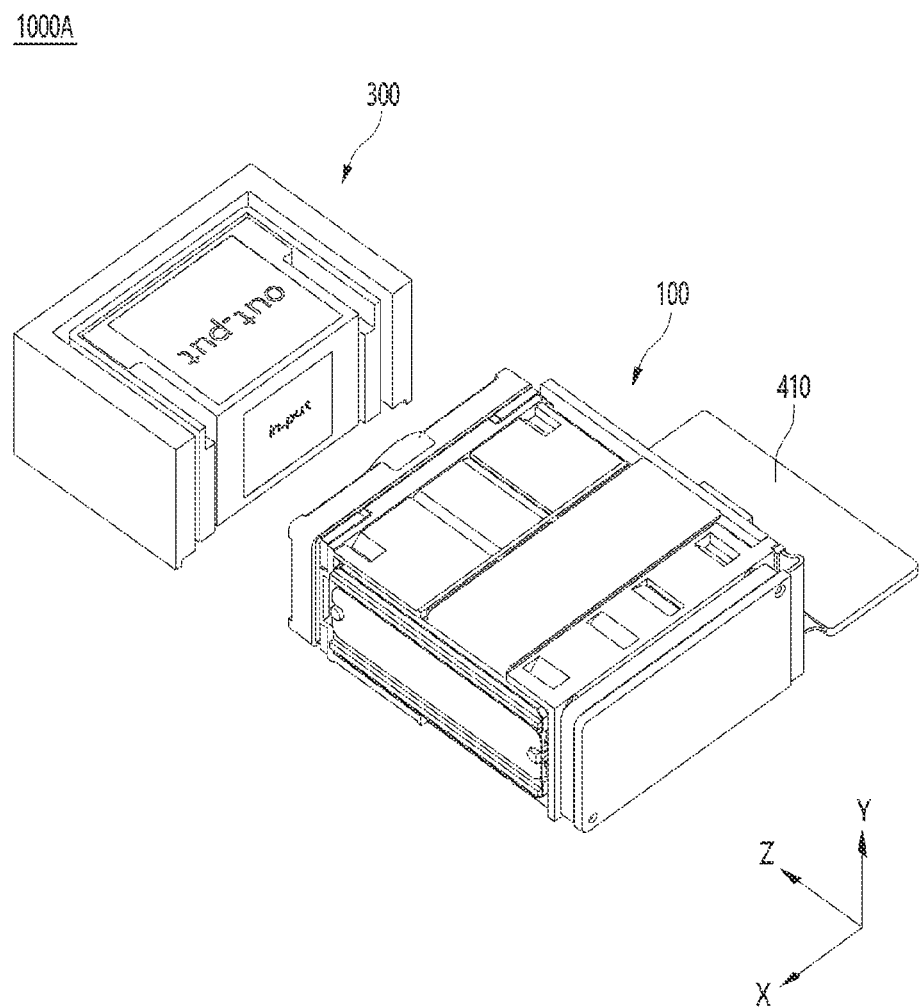

[FIG. 3a]
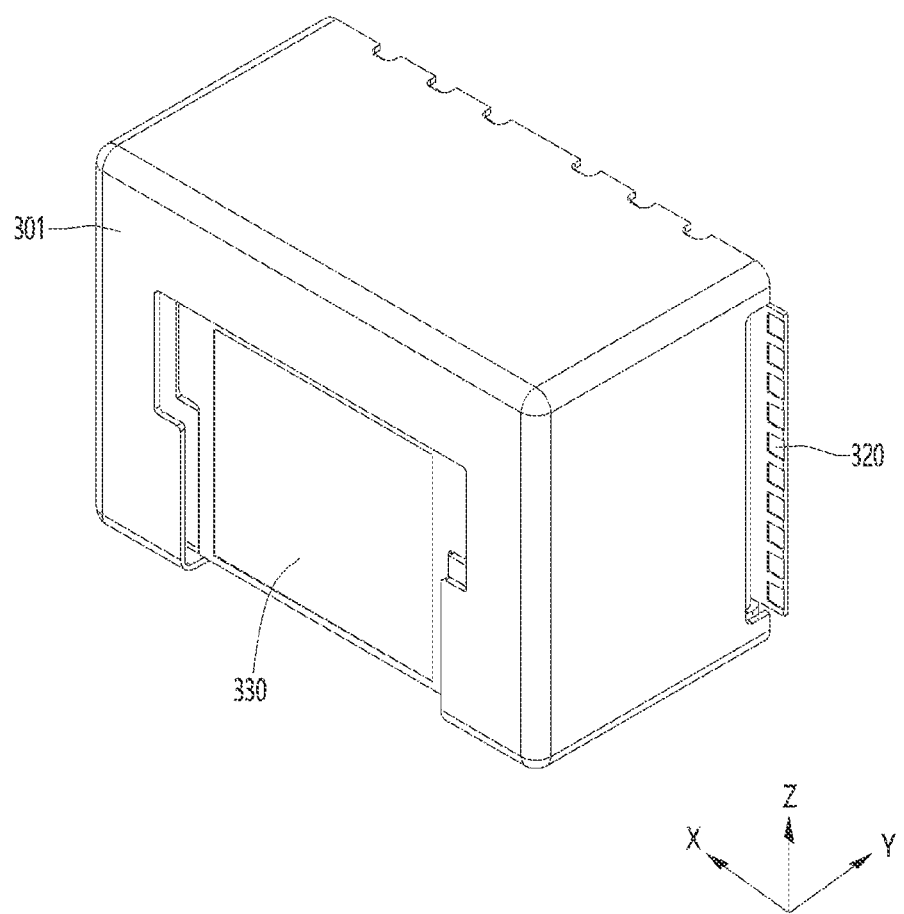

[FIG. 3b]
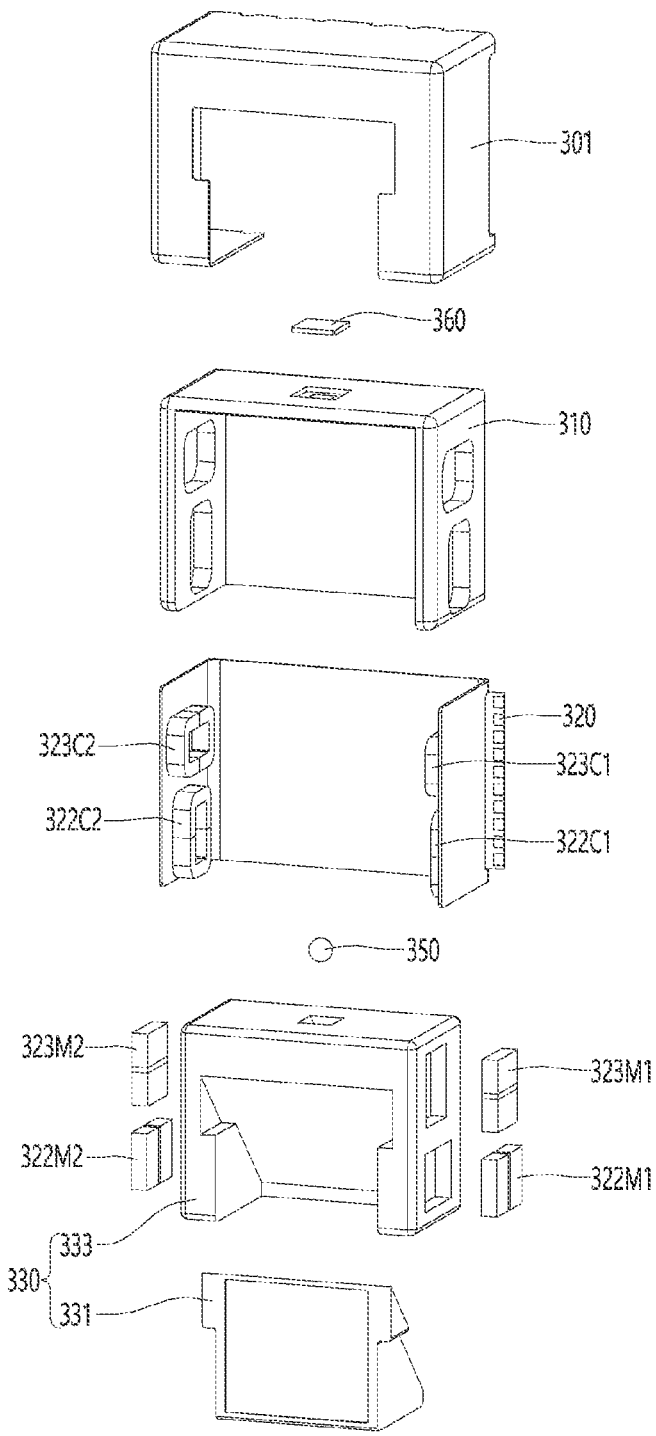

[FIG. 4a]
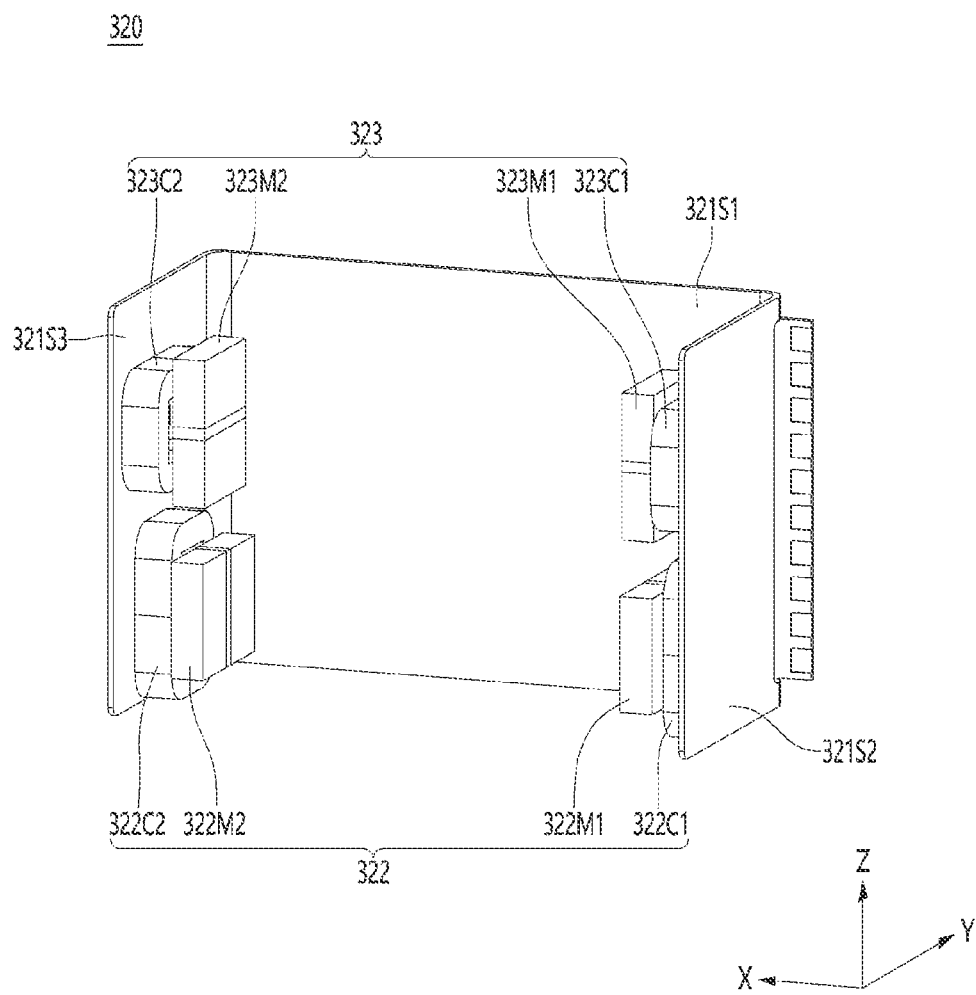

[FIG. 4b]
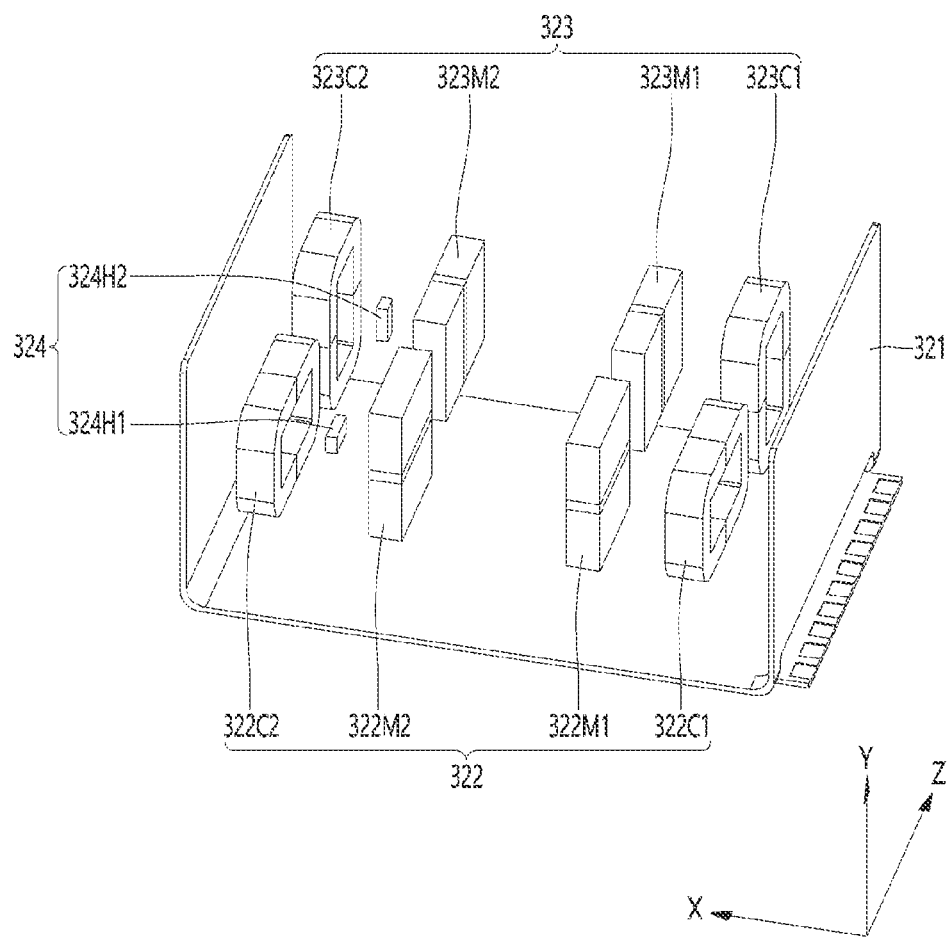

[FIG. 5a]
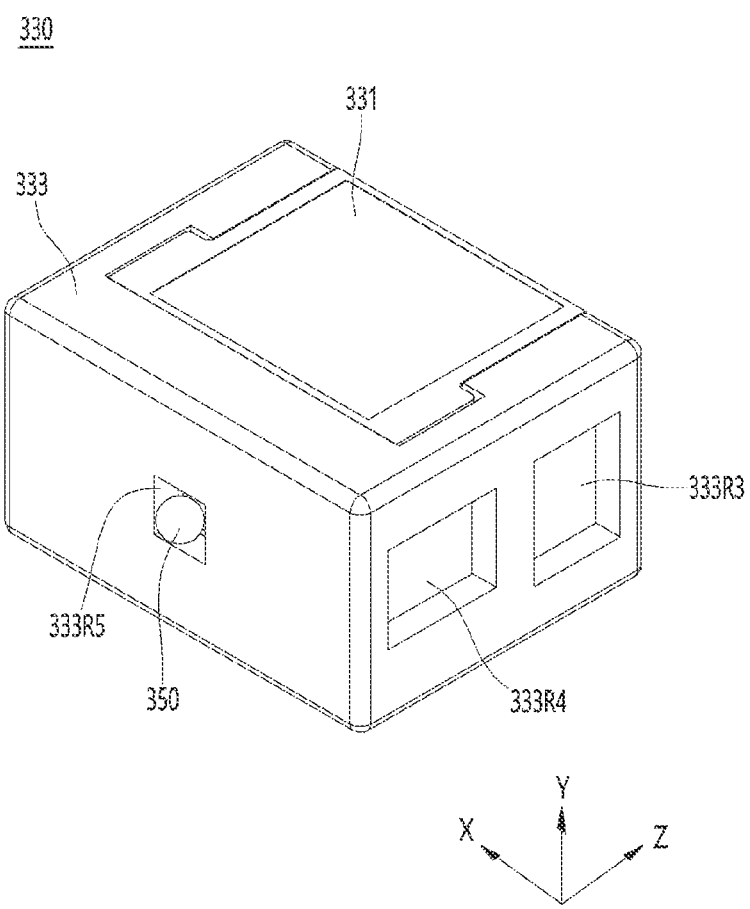

[FIG. 5b]
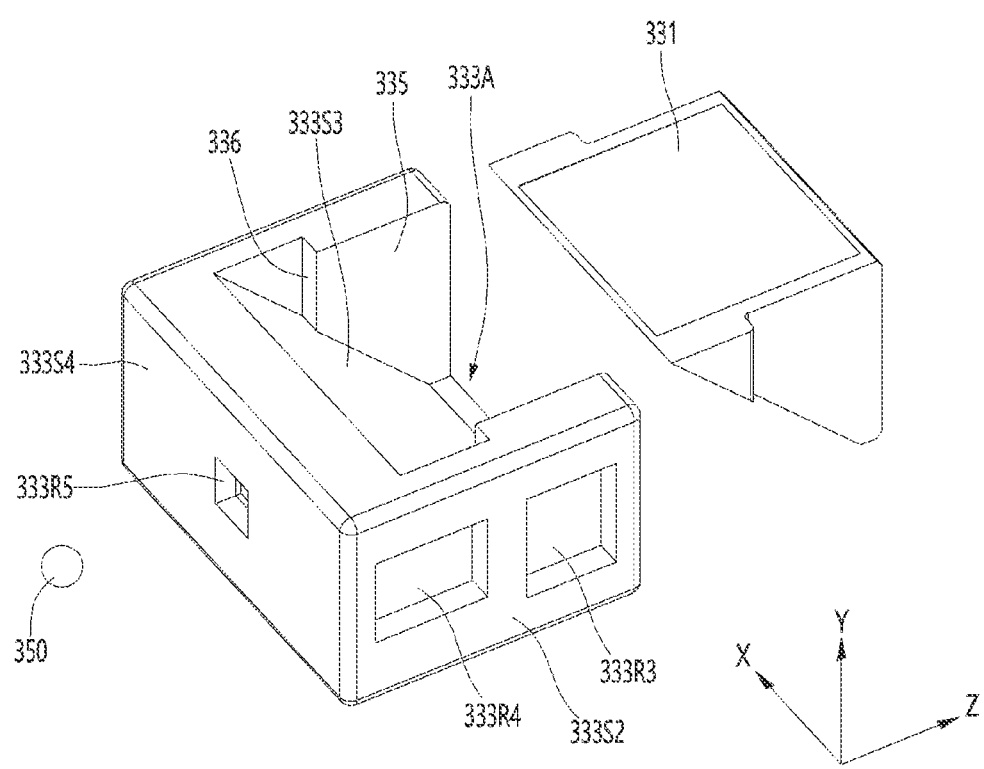

[FIG. 5c]
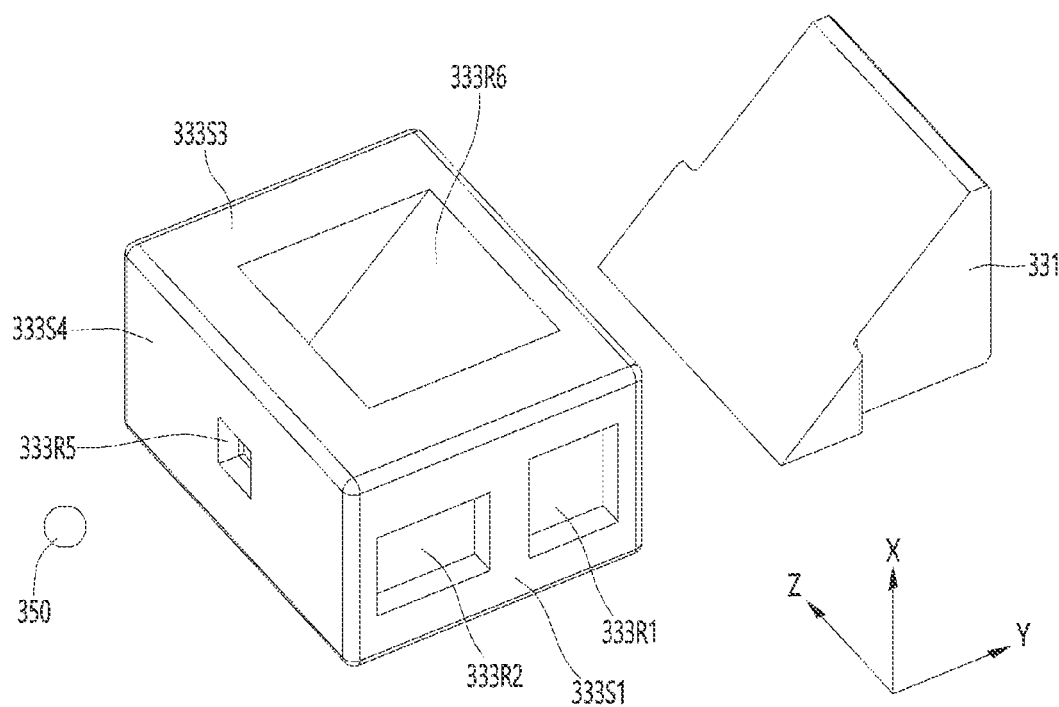

[FIG. 6a]
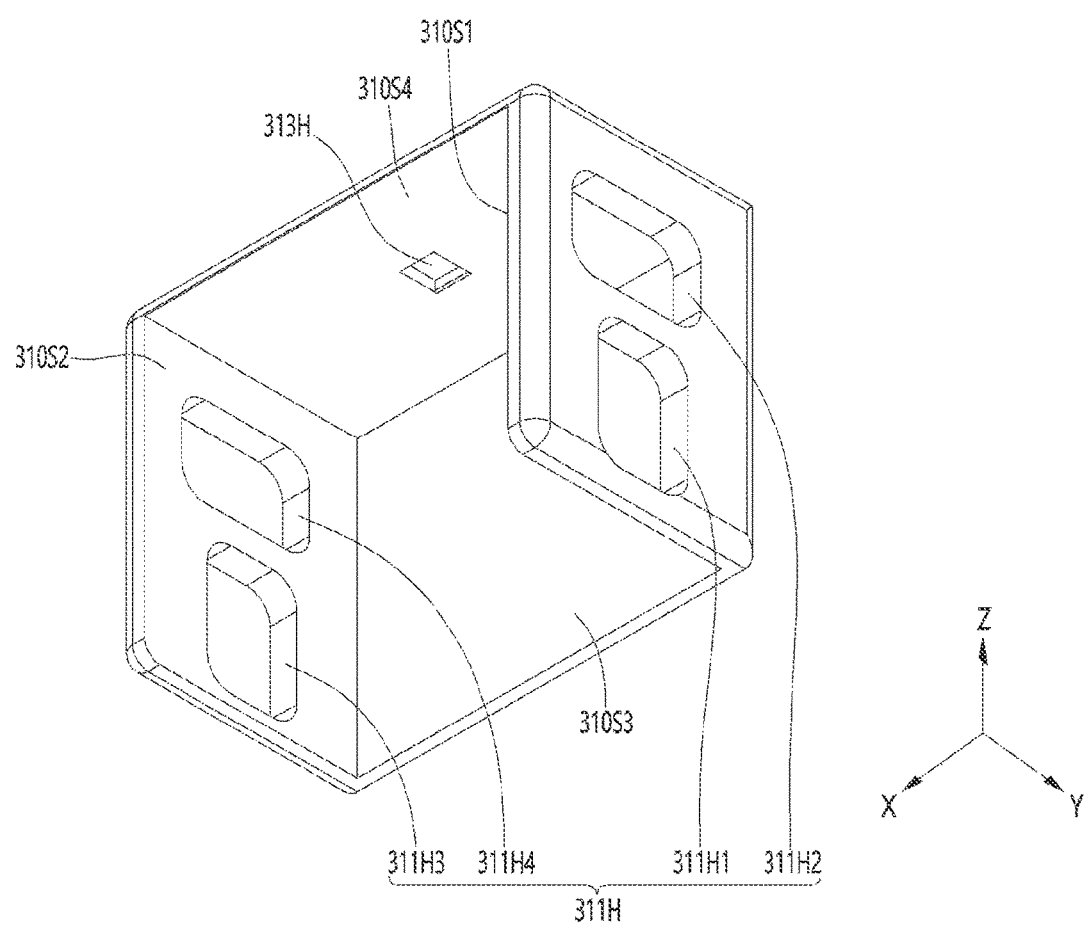

[FIG. 6b]
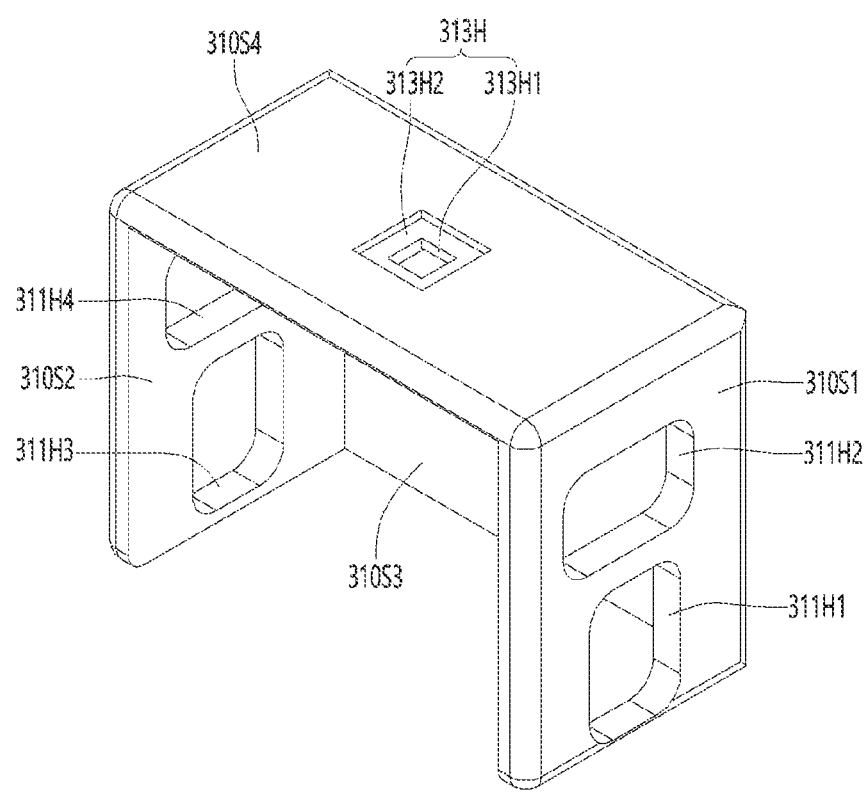

[FIG. 7]
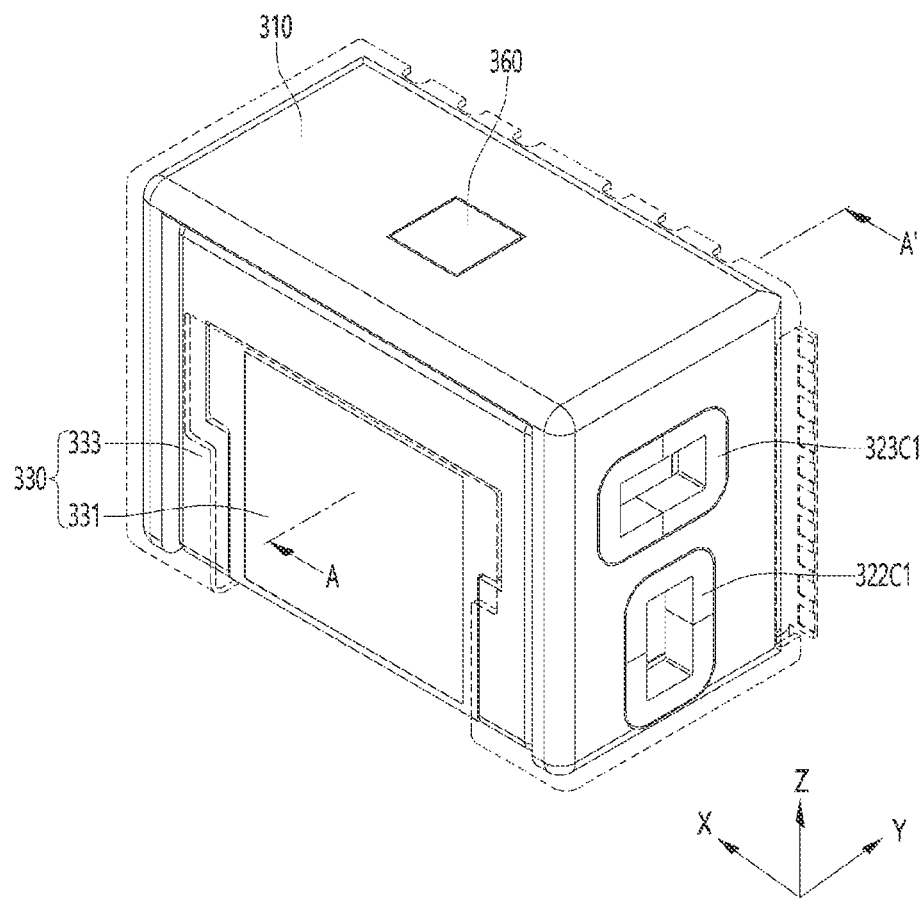

[FIG. 8]
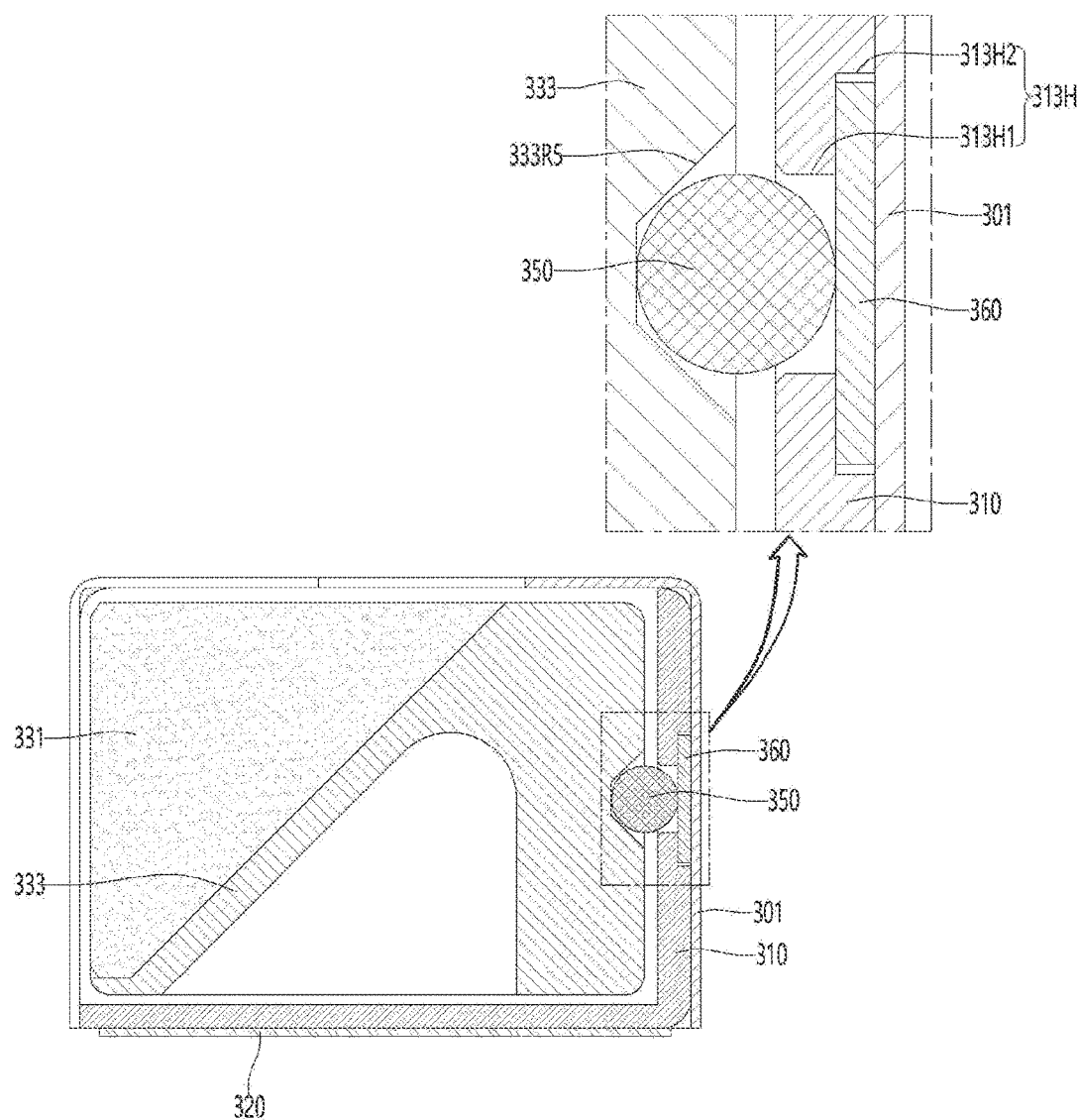

[FIG. 9a]
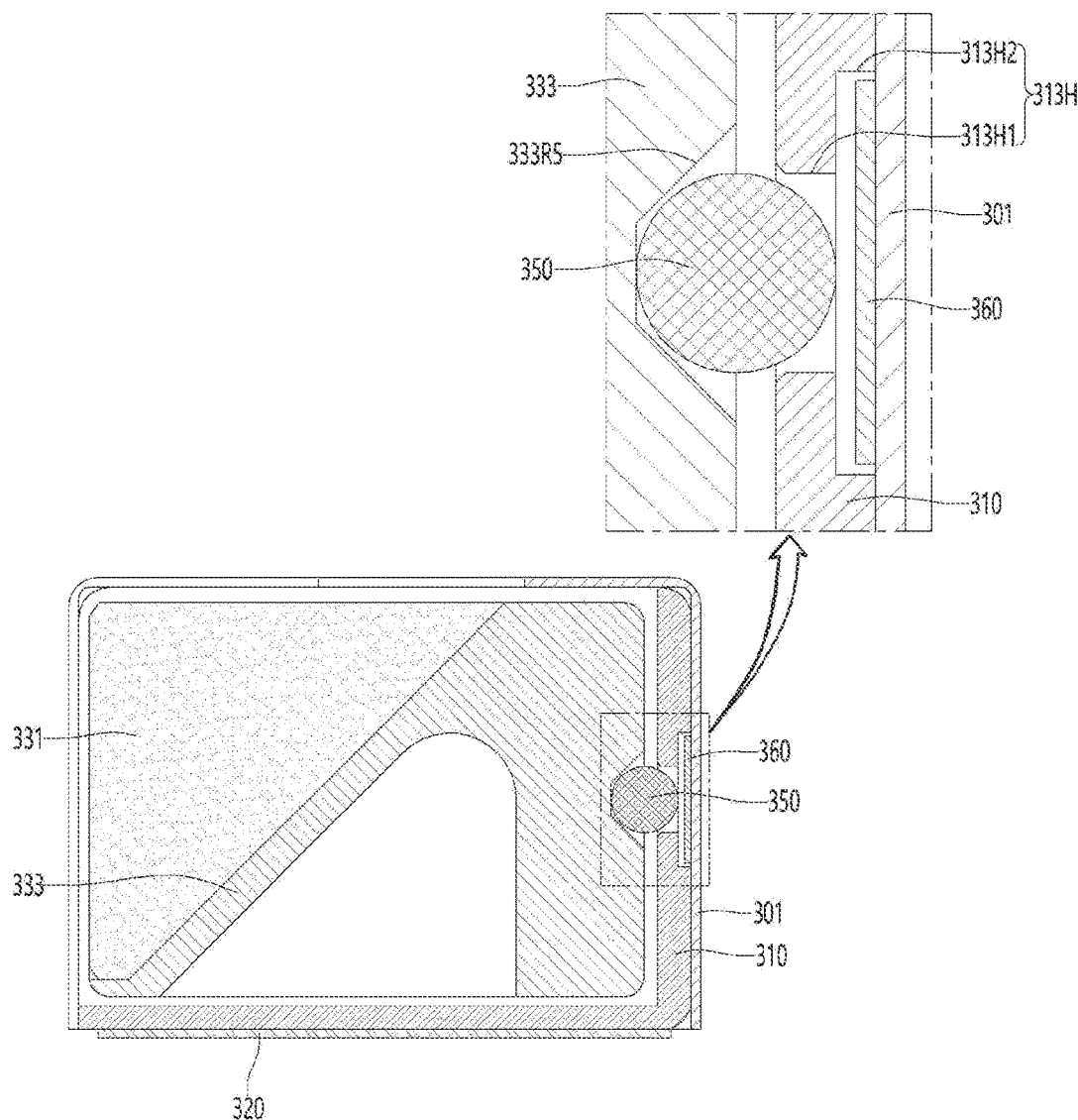

[FIG. 9b]
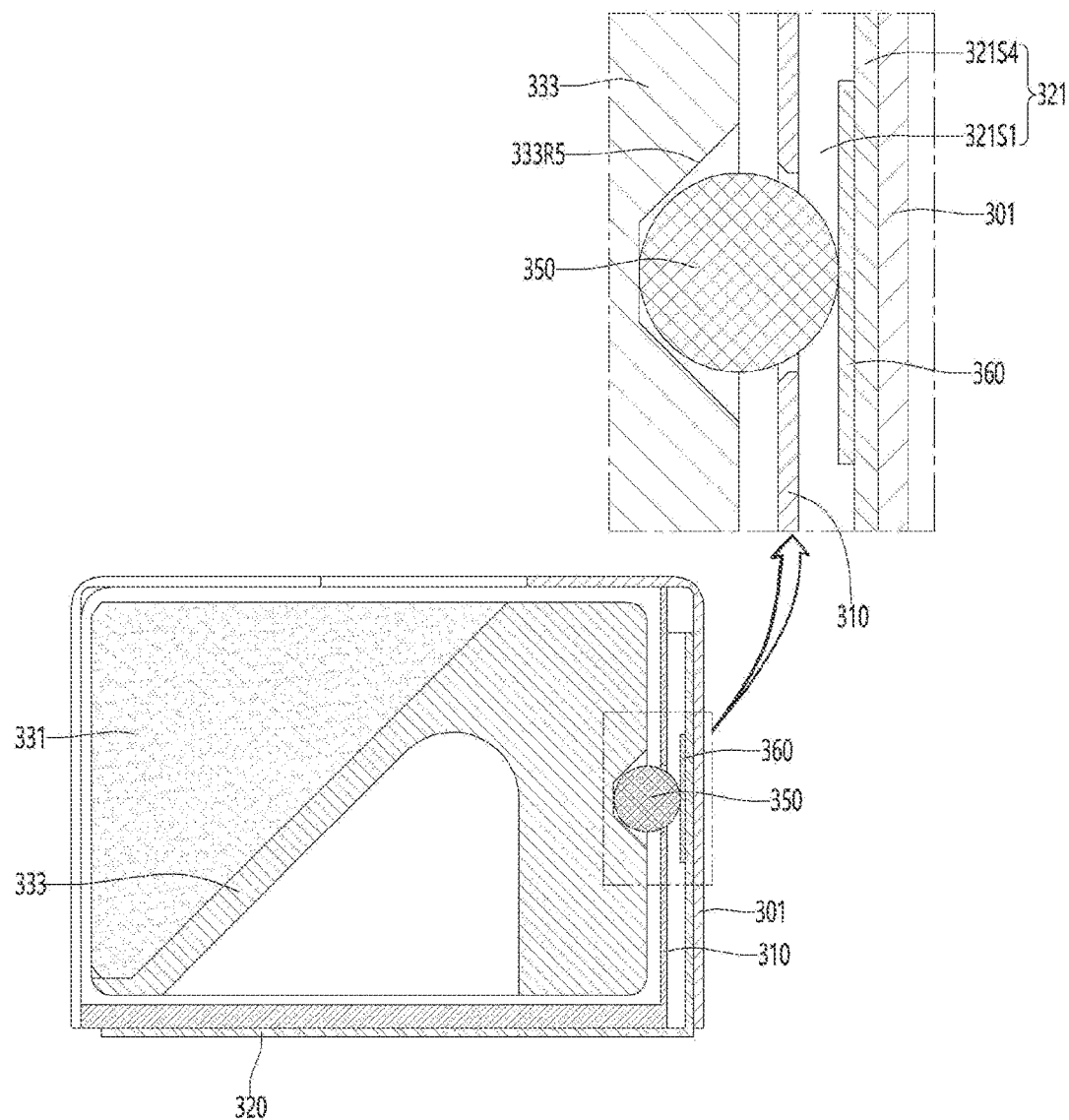

[FIG. 10a]
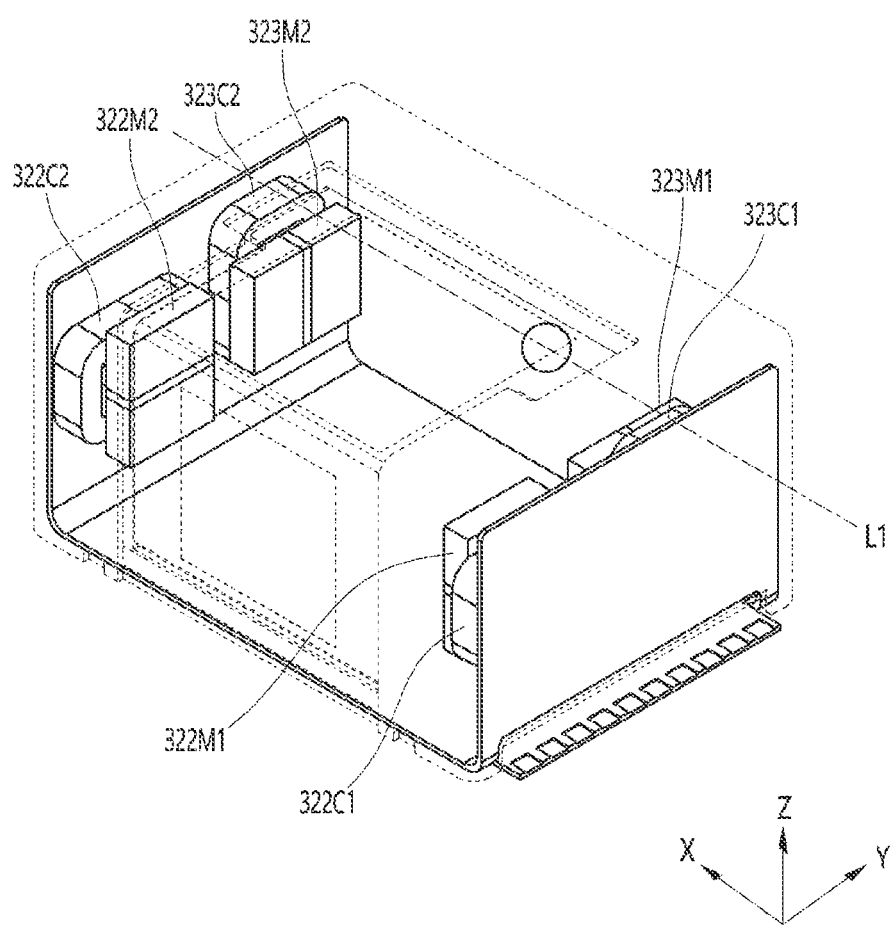

[FIG. 10b]
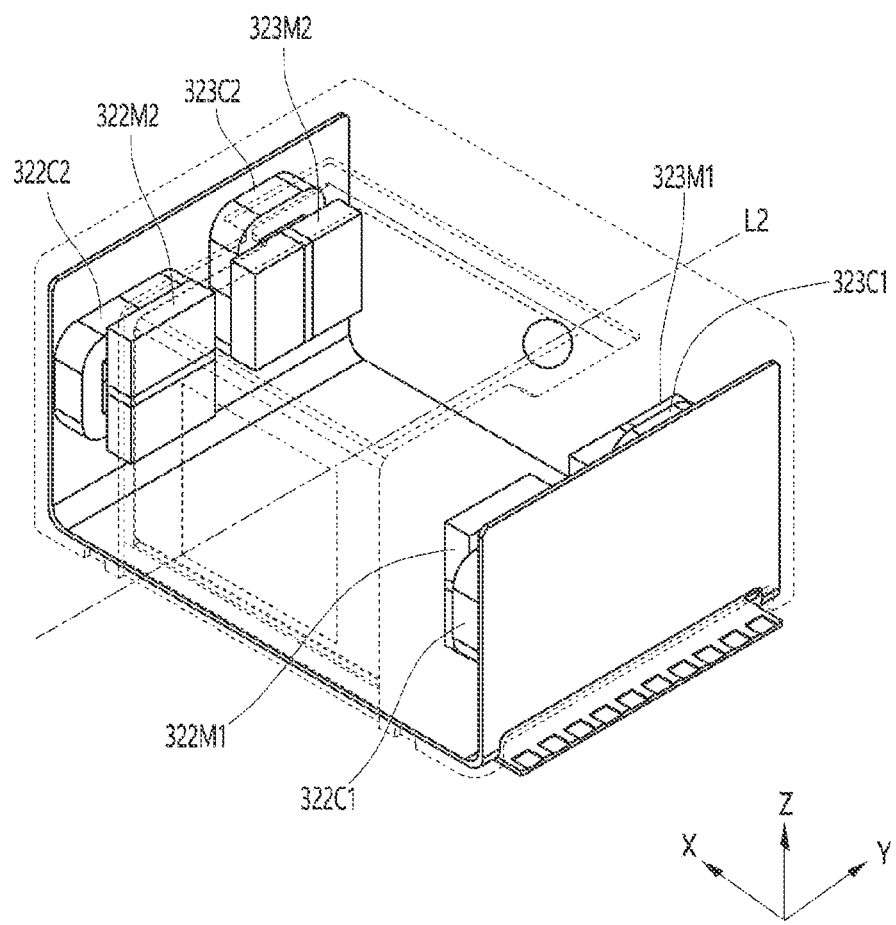

[FIG. 11]
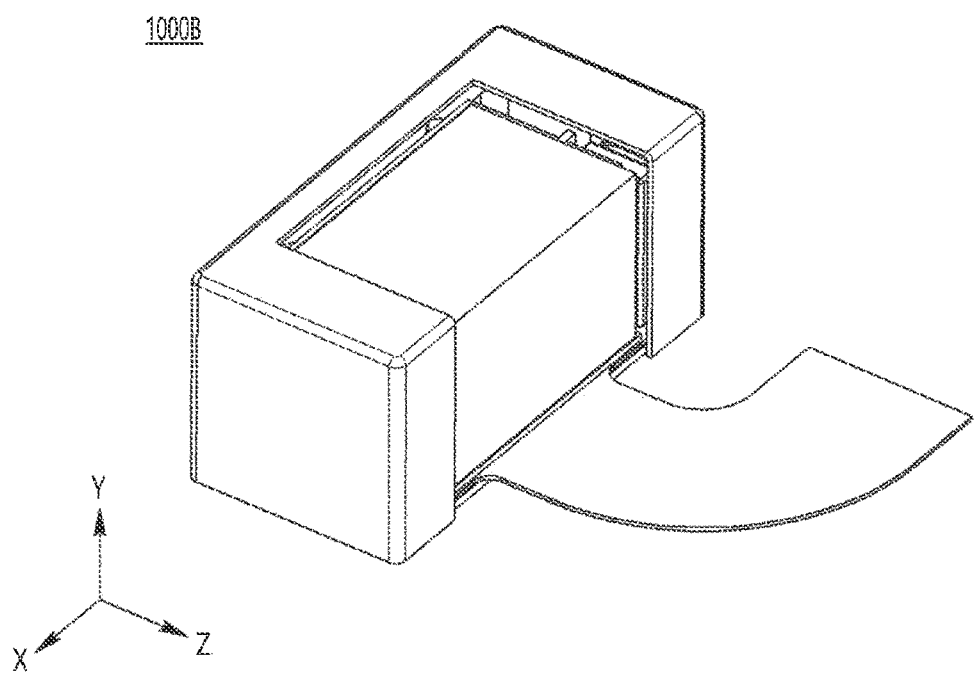

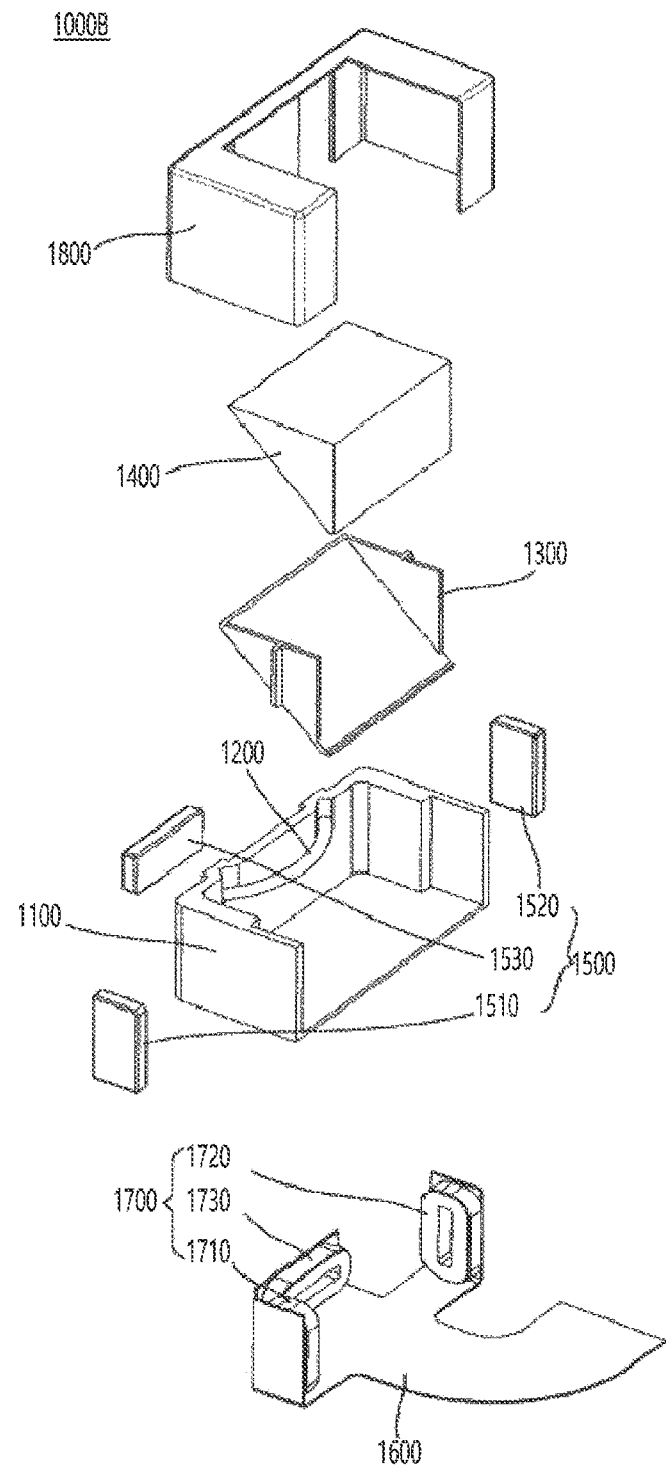
[FIG. 12]

[FIG. 13]
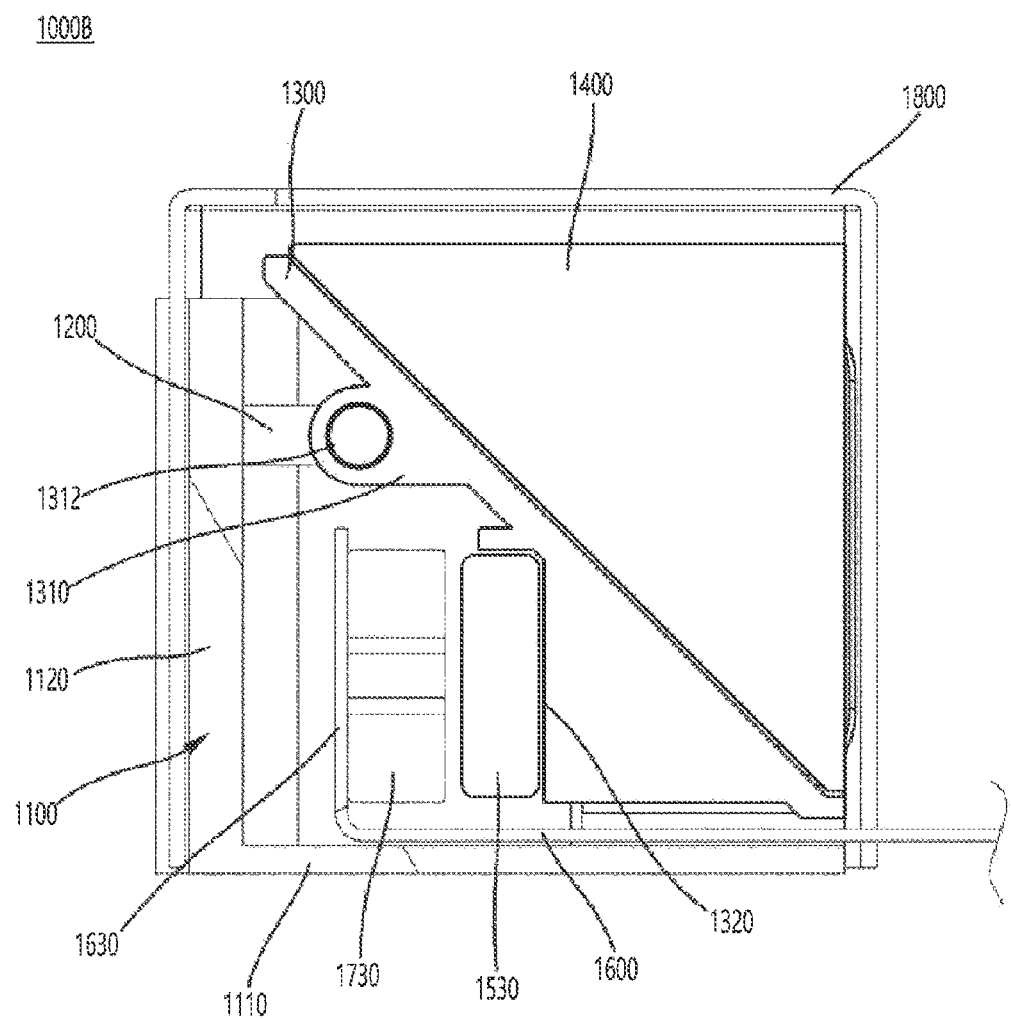

[FIG. 14]
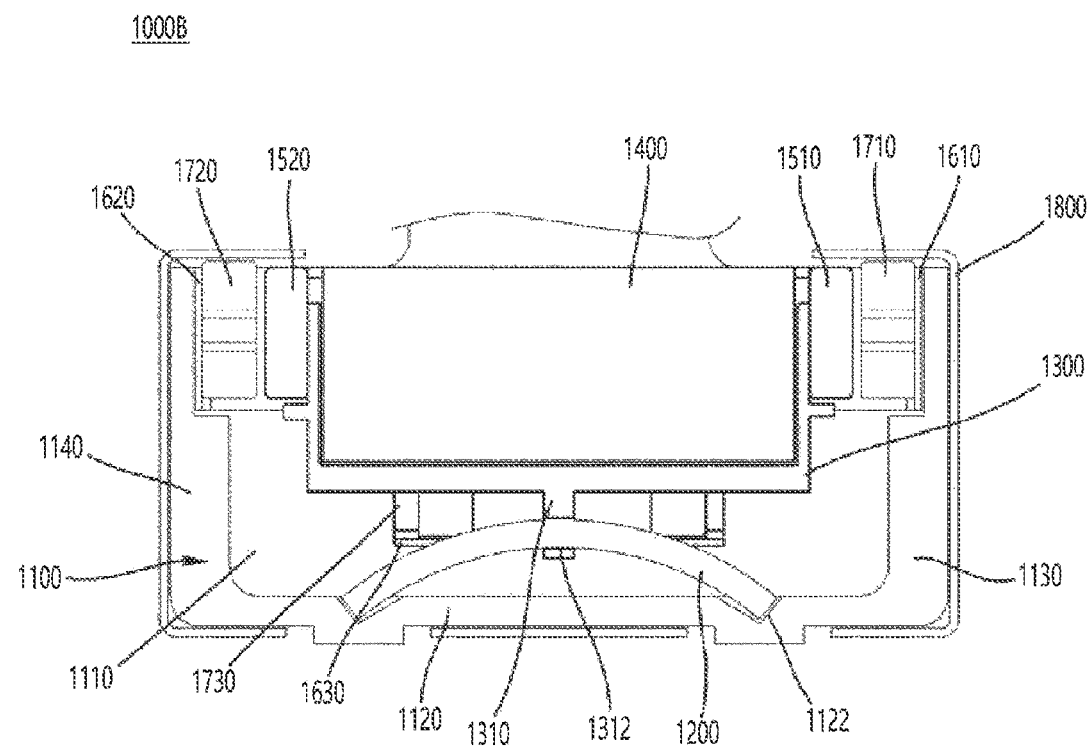

[FIG. 15]
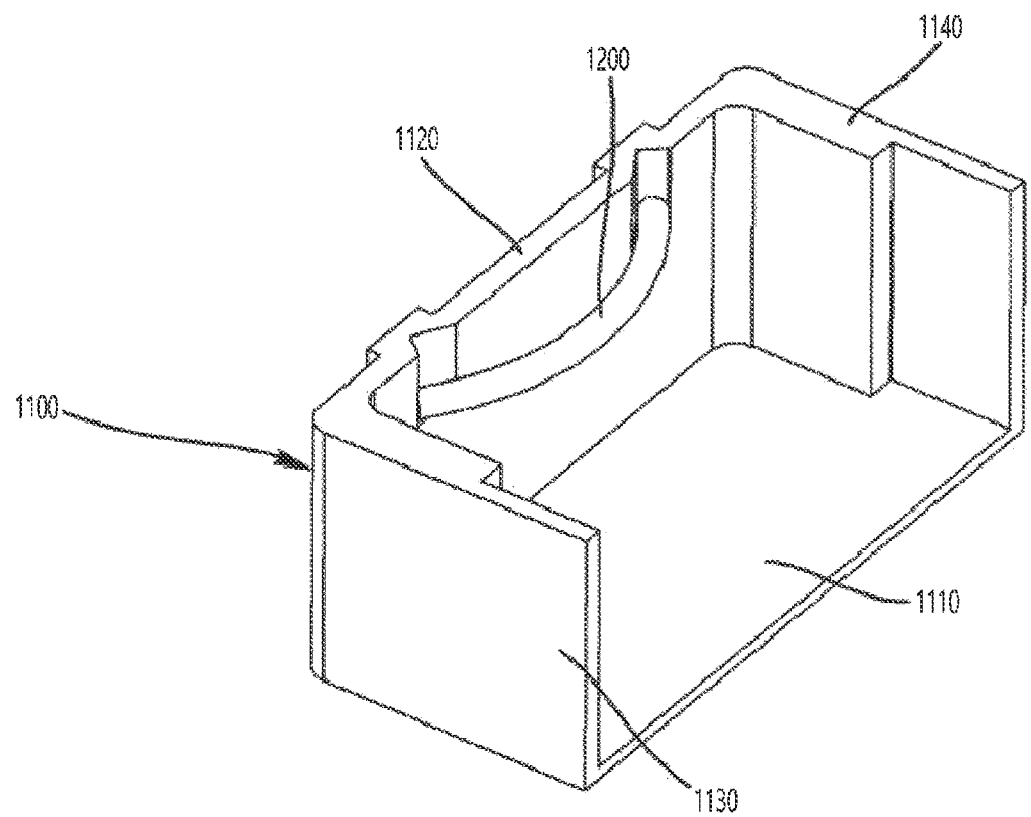

[FIG. 16]
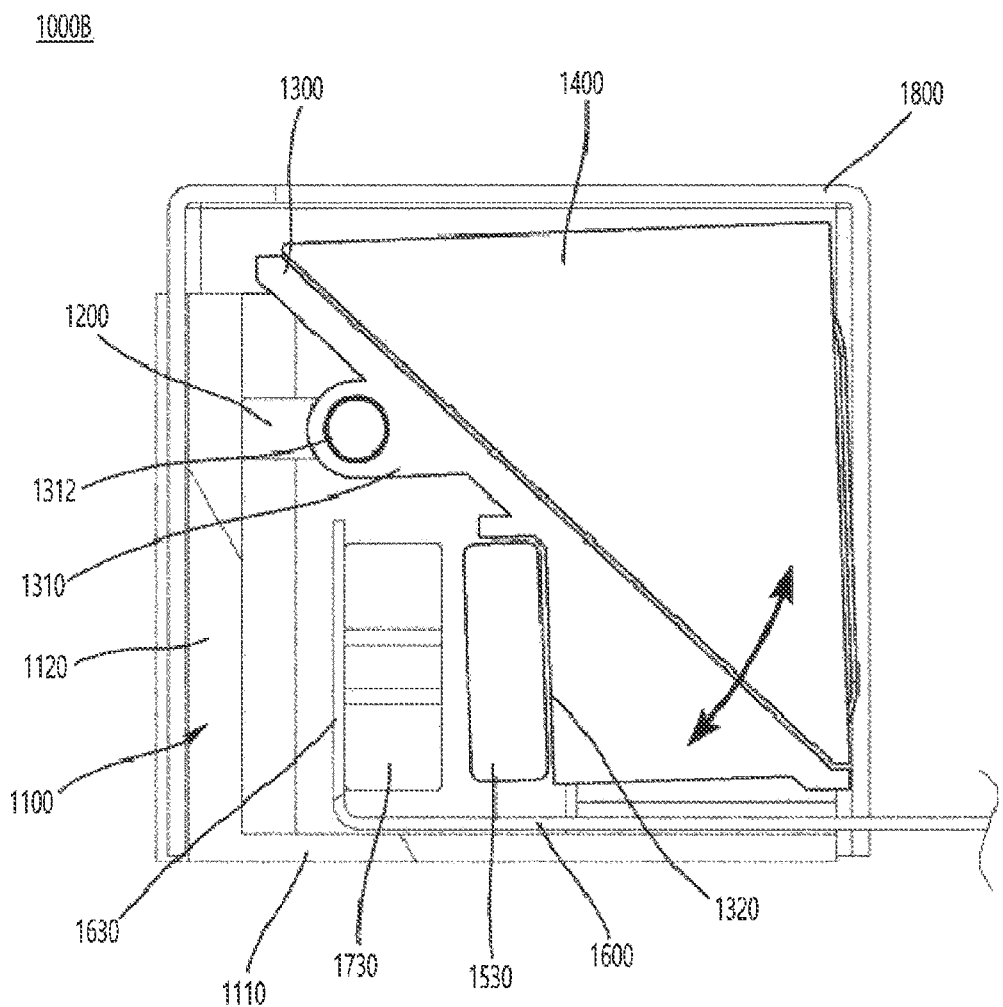

[FIG. 17]
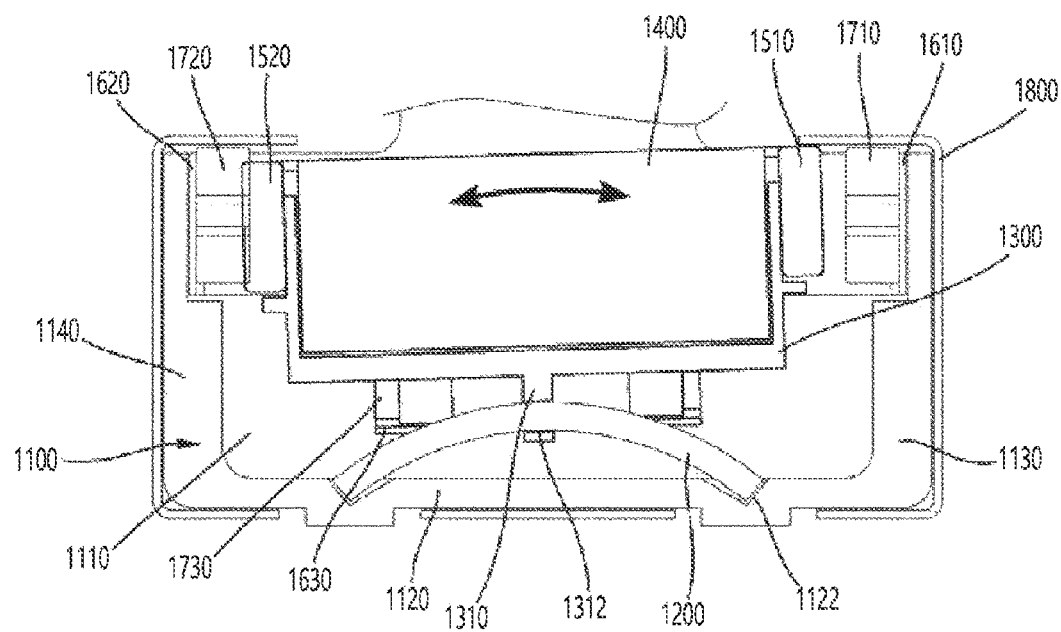

[FIG. 18]
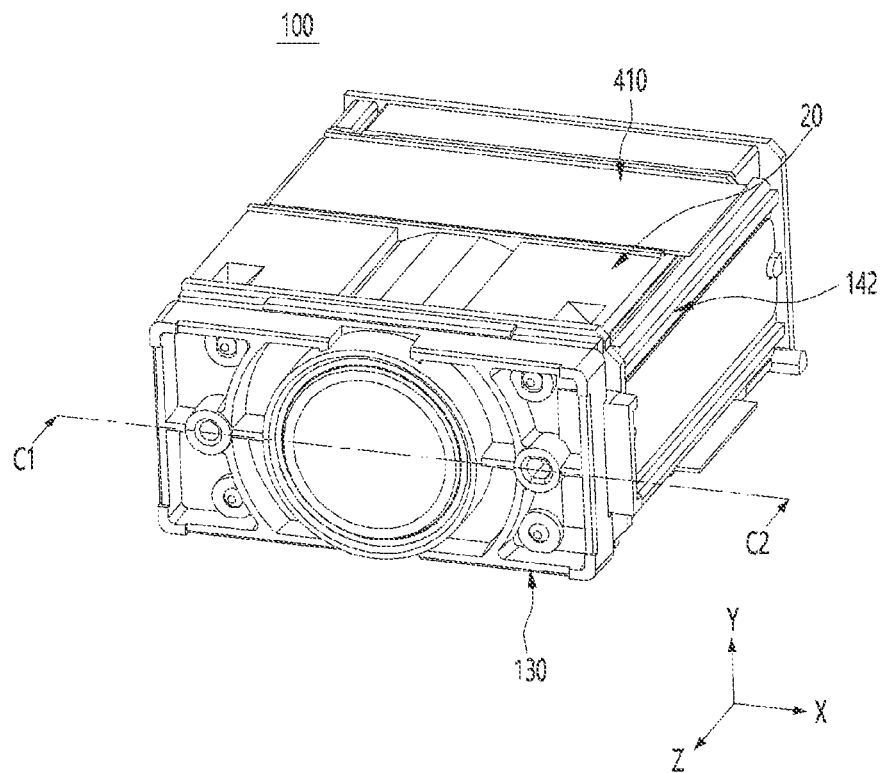
[FIG. 19]
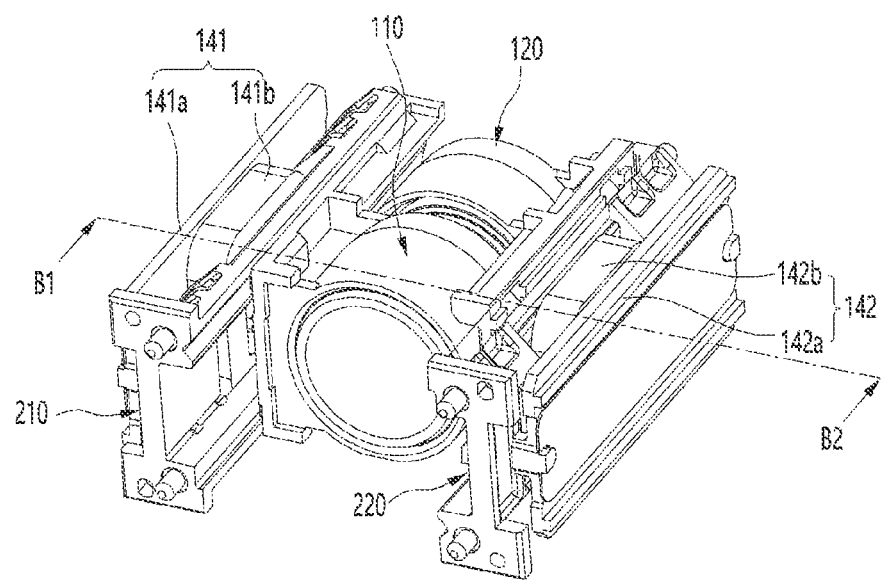

[FIG. 20]
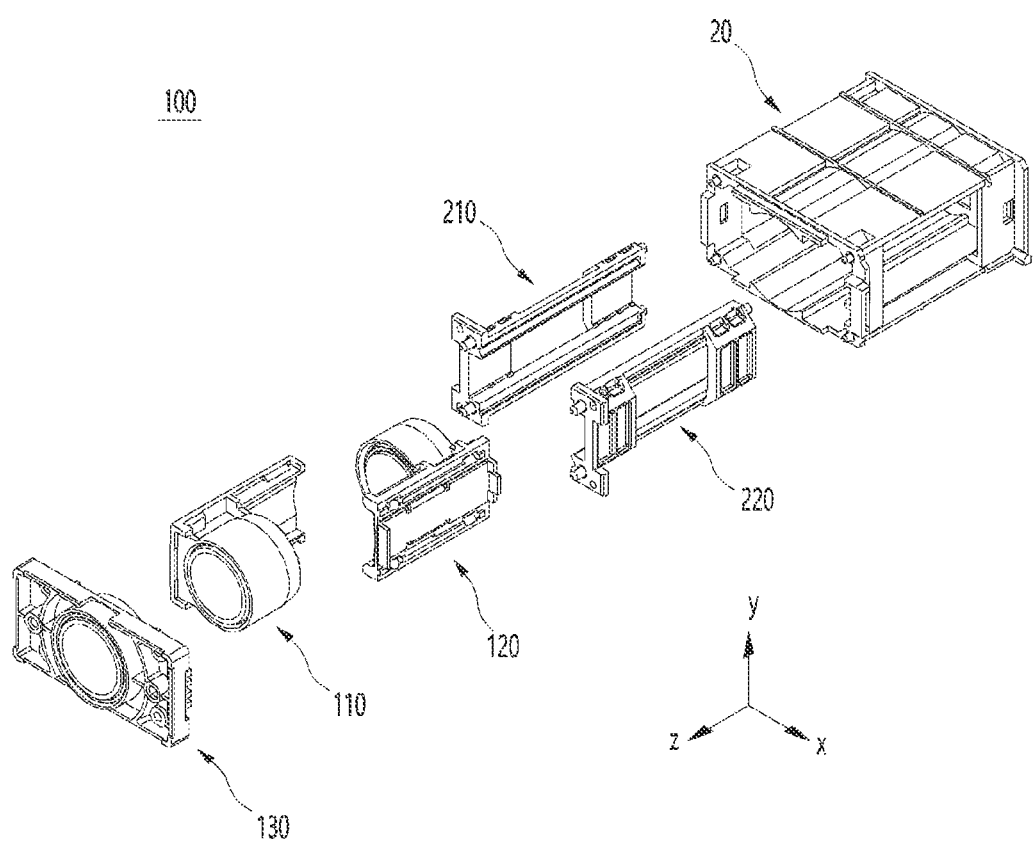

[FIG. 21]
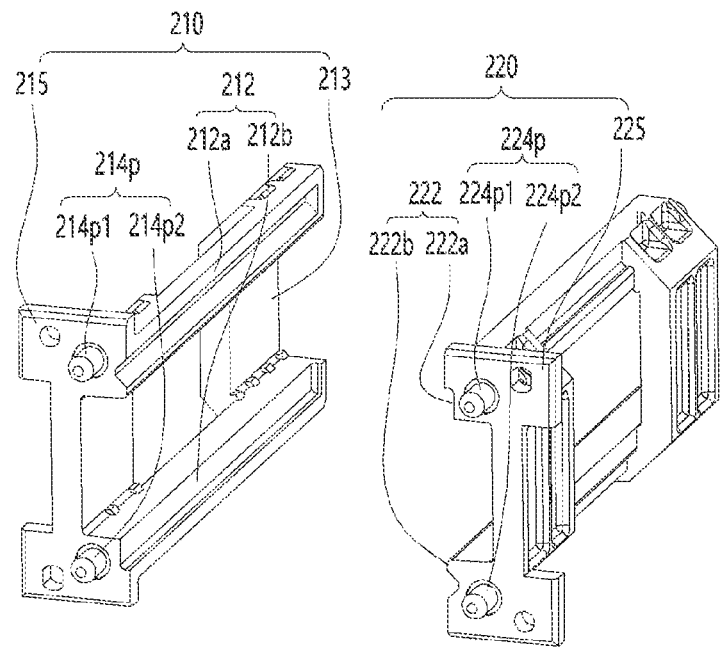
[FIG. 22a]
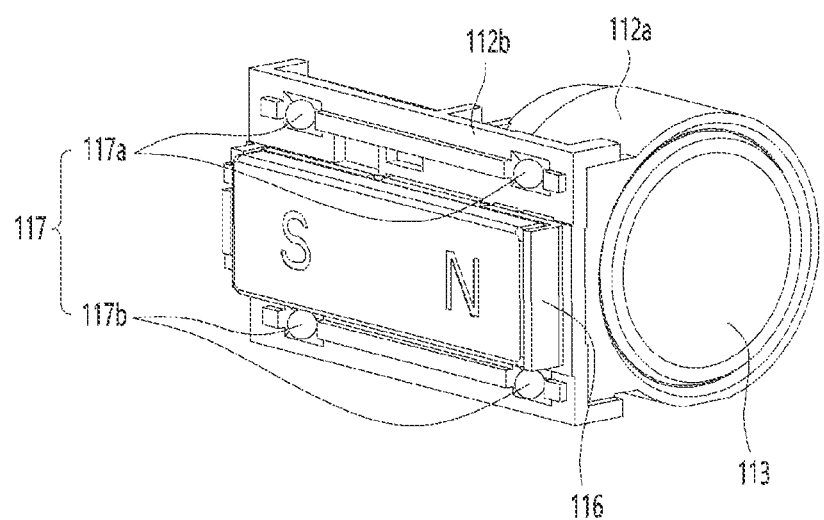

[FIG. 22b]
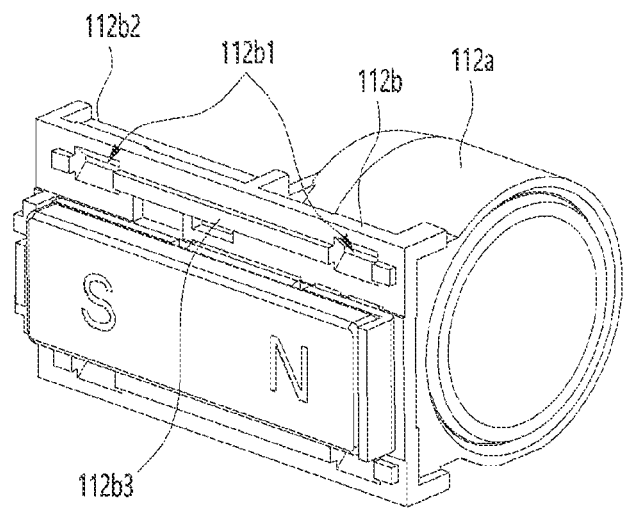
[FIG. 23]
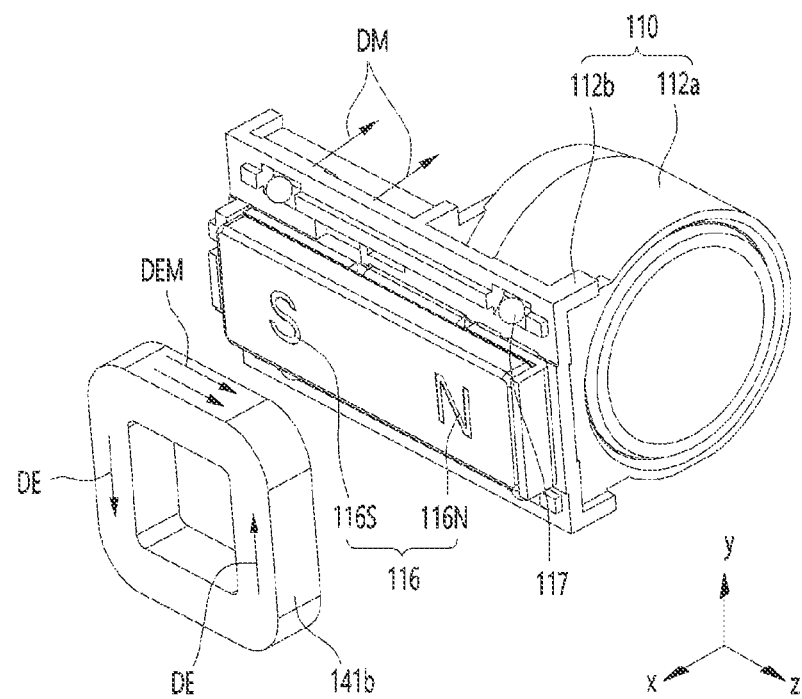

[FIG. 24]
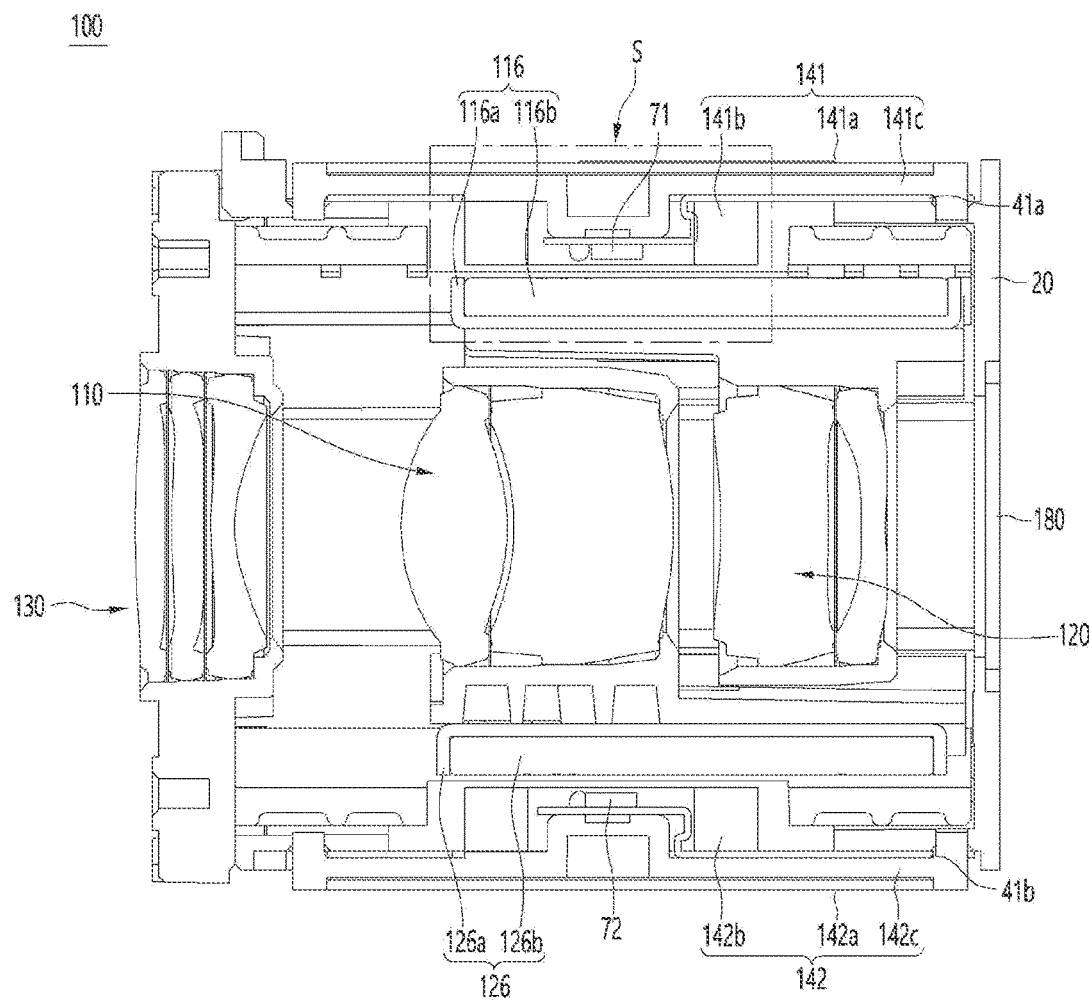

[FIG. 25a]
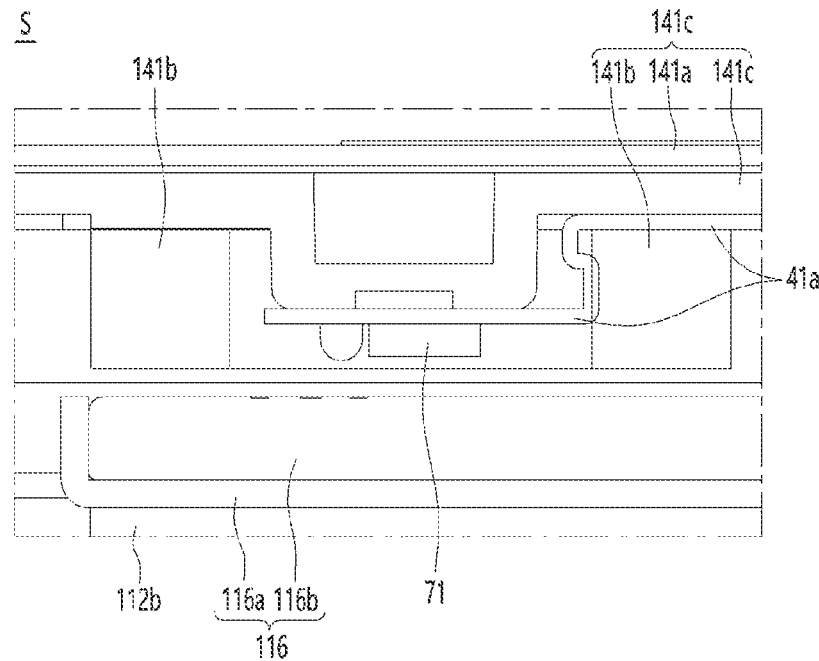
[FIG. 25b]
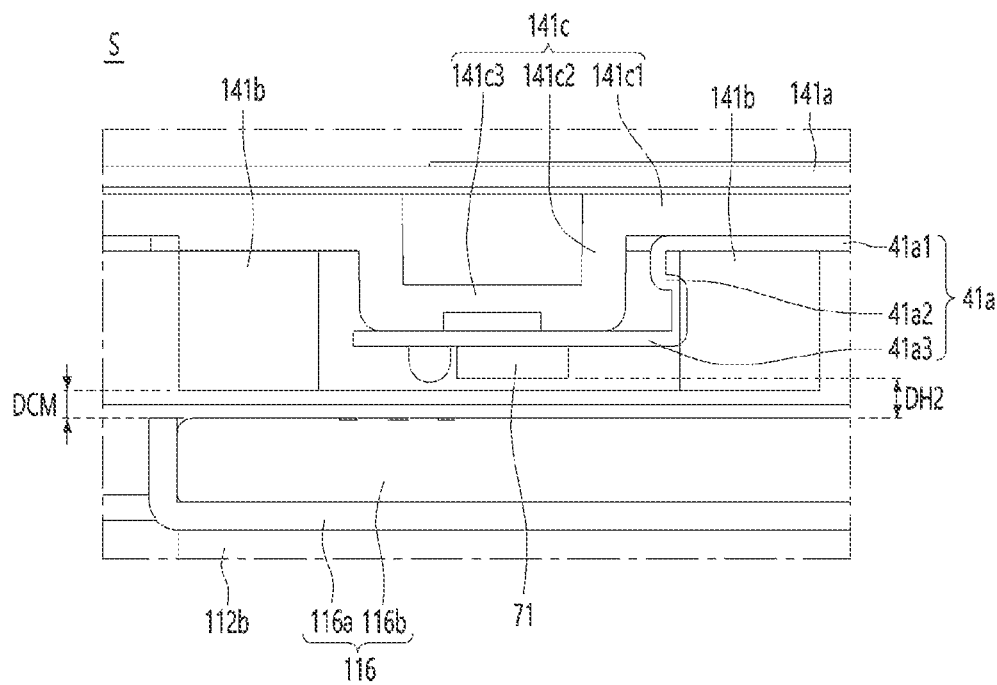

[FIG. 25c]
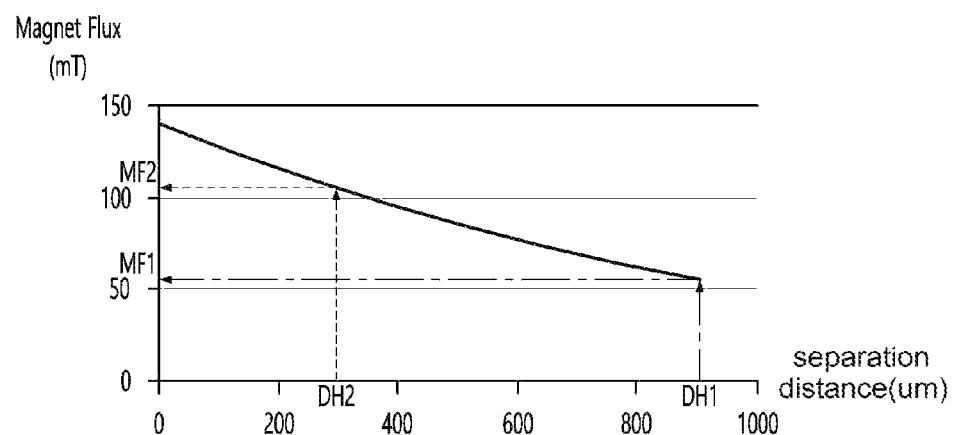
[FIG. 26a]
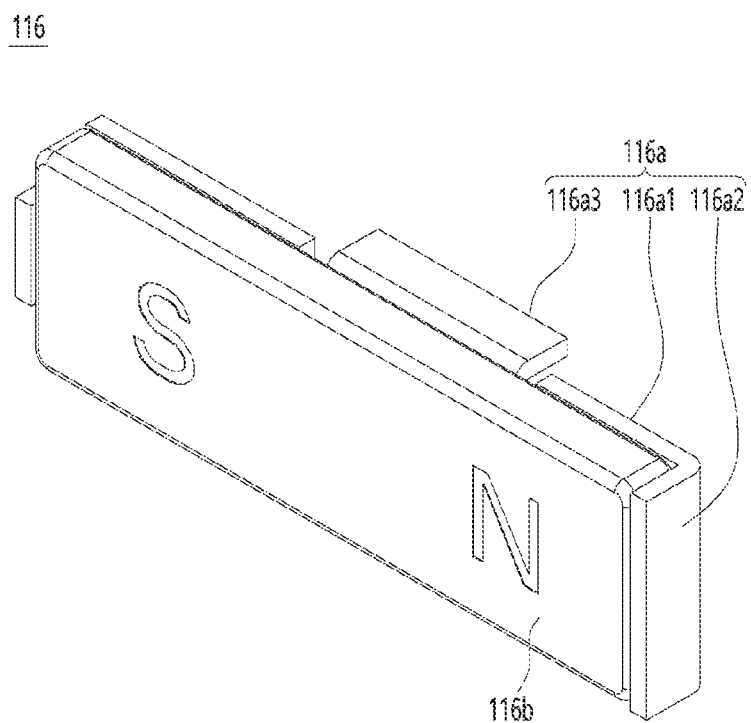

[FIG. 26b]
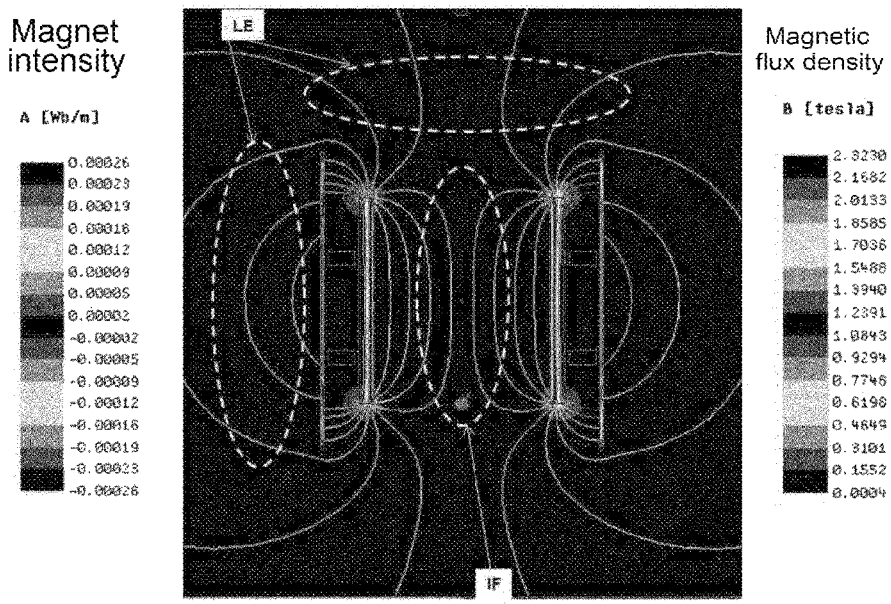
[FIG. 26c]
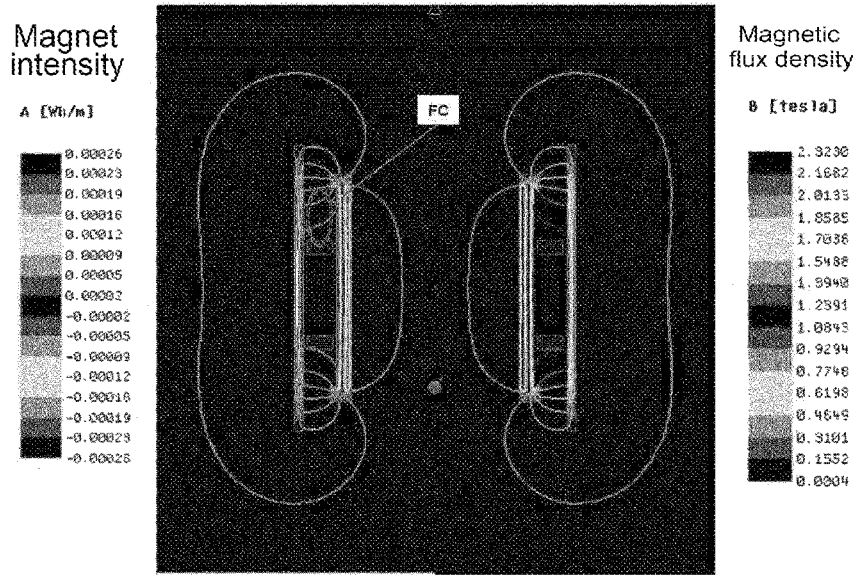

[FIG. 27]
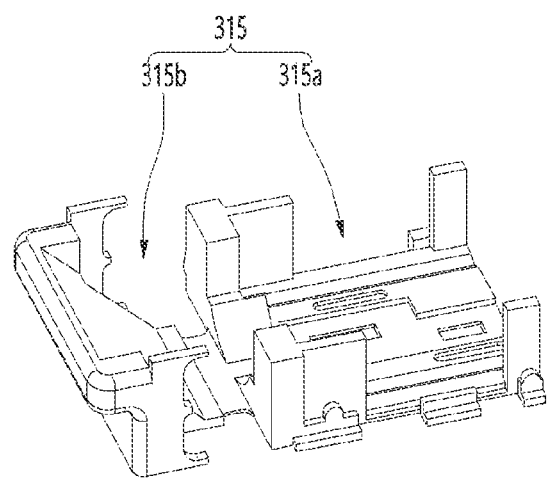
[FIG. 28]
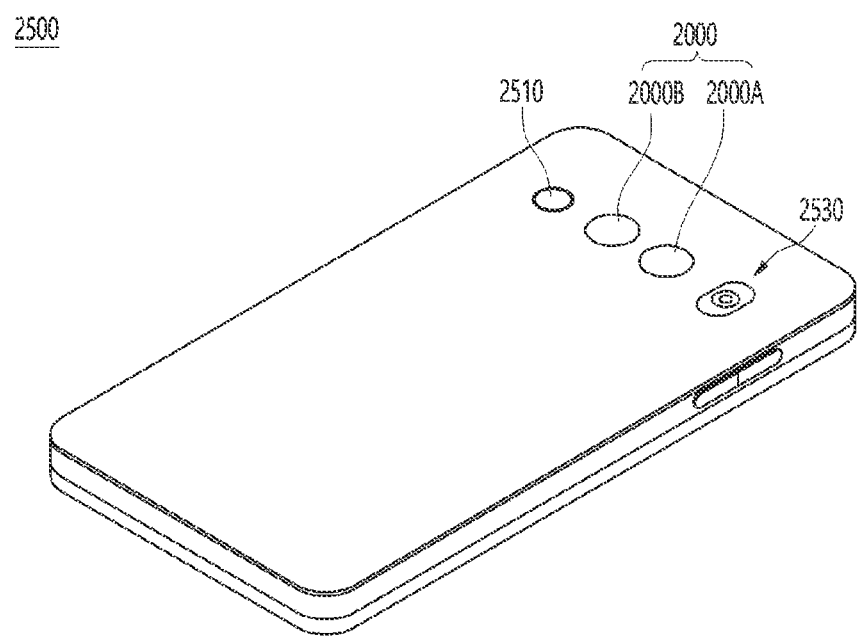

[FIG. 29]
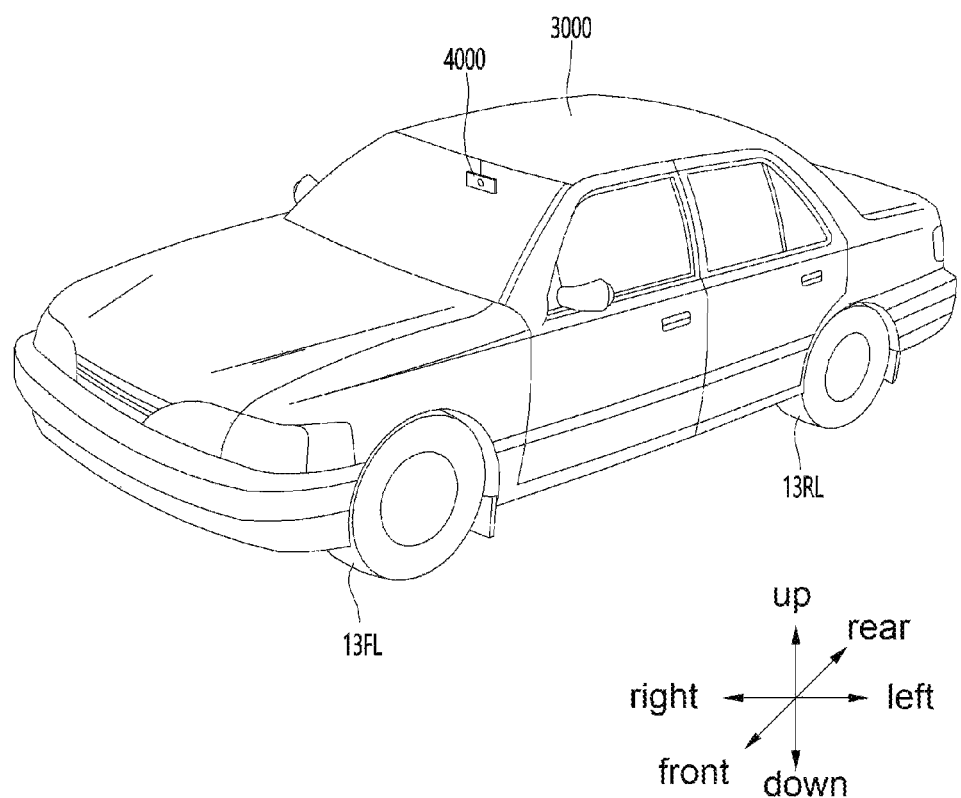

CAMERA ACTUATOR

CROSS REFERENCE TO RELATED APPLICATIONS

This application is the National Phase of PCT International Application No. PCT/KR2020/009640, filed on Jul. 22, 2020, which claims priority under 35 U.S.C. 119(a) to Patent Application Nos. 10-2019-0089227, filed in the Republic of Korea on Jul. 23, 2019 and 10-2019-0091917, filed in the Republic of Korea on Jul. 29, 2019, all of which are hereby expressly incorporated by reference into the present application.

TECHNICAL FIELD

An embodiment relates to a camera actuator.

BACKGROUND ART

A camera module captures a subject and stores it as an image or video, and it is being installed in mobile terminals such as cell phones, laptops, drones, and vehicles.

On the other hand, portable devices such as smartphones, tablet PCs, and laptops have built-in ultra-small camera modules, and such a camera module may perform an auto-focus (AF) function that automatically adjusts a distance between a image sensor and lens to align the focal lengths of the lenses.

In addition, a recent camera module may perform a zooming function of zooming up or zooming out by increasing or decreasing the magnification of a distant subject through a zoom lens.

In addition, a recent camera module employs an image stabilization (IS) technology to correct or prevent image shake due to an unstable fixing device or a camera movement caused by a user's movement.

Meanwhile, a camera module applied to a mobile terminal such as a mobile phone recently uses a prism to reduce the size of a product while implementing a zooming function.

DISCLOSURE

Technical Problem

An embodiment is to provide a camera actuator capable of achieving slimming.

One of the technical problems of an embodiment is to provide an ultra-small, ultra-slim actuator.

In addition, one of the technical problems of the embodiments is to provide a camera actuator that may secure a sufficient amount of light by eliminating lens size limitation of an optical system lens assembly when OIS is implemented.

In addition, one of the technical problems of the embodiment is to provide a camera actuator that can solve the technical contradiction that is applied to the thickness limit of the camera module when the size of the variable lens increases in order to increase the amount of light received for clear image quality.

In addition, one of the technical problems of the embodiments is to provide a camera actuator capable of achieving the best optical characteristics and a camera module including the same by minimizing occurrence of a decenter or tilt phenomenon when the OIS is implemented.

In addition, one of the technical problems of the embodiments is to provide a camera actuator capable of preventing a magnetic field interference with an AF or Zoom magnet when the OIS is implemented, and a camera module including the same.

Technical Solution

A camera actuator according to an embodiment includes a housing; a prism unit disposed in the housing; and a driving unit for tilting the prism unit, wherein a ball bearing and a pulling magnet for generating attractive force to each other are disposed in the prism unit and the housing, and wherein the prism unit is supported to the housing by the attractive force between the ball bearing and the pulling magnet.

In addition, the ball bearing is made of a magnetic material.

In addition, the prism unit includes: a prism mover having a receiving portion; and a prism disposed in the receiving portion of the prism mover, and wherein the ball bearing is disposed on the prism mover.

In addition, an outer surface of the prism unit facing the pulling magnet includes a groove in which the ball bearing is disposed, and wherein an adhesive member for fixing the ball bearing is disposed in the groove.

In addition, a housing hole is formed in a side portion of the housing facing the ball bearing, and wherein at least a part the ball bearing is disposed in the housing hole.

In addition, the housing hole includes: a first portion disposed on an inner surface of the side portion of the housing; and a second portion connected to the first portion and disposed on an outer surface of the side portion, wherein at least a part of the ball bearing is disposed in the first portion, and wherein the pulling magnet is disposed in the second portion.

In addition, the first portion and the second portion have different sizes.

In addition, the pulling magnet is fixed and disposed in the second portion of the housing hole.

In addition, the camera actuator comprises a cover member disposed on the housing, and the pulling magnet is fixed and disposed on an inner surface of the cover member facing the housing hole.

In addition, the driving unit includes a driving unit circuit board, and the driving unit circuit board includes a substrate region disposed in a region facing the housing hole, and the pulling magnet is fixed and disposed on the substrate region.

In addition, the prism unit is rotatably provided in at least one of a first direction and a second direction perpendicular to the first direction with respect to the ball bearing as a reference axis.

In addition, the ball bearing is in point contact with the pulling magnet.

In addition, the driving unit includes: a first driving unit providing a driving force for rotating the prism unit in the first direction; and a second driving unit providing a driving force for rotating the prism unit in the second direction, and wherein the first driving unit and the second driving unit are disposed on a first outer surface of the prism unit and a second outer surface facing the first outer surface, respectively.

In addition, the first outer surface of the prism unit includes a first recess in which a first-first magnet of the first driving unit is disposed; and a second recess in which a second-first magnet of the second driving unit is disposed. And, the second outer surface of the prism unit includes a third recess in which a first-second magnet of the first driving unit are disposed; and a fourth recess in which a second-second magnet of the fourth driving unit is disposed.

In addition, the housing includes a first-first housing hole in which a first-first coil facing the first-first magnet of the first driving unit is disposed, a first-second housing hole in which a second-first coil facing the second-first magnet of the second driving unit is disposed; a first-third housing hole in which a first-second coil facing the first-second magnet of the first driving unit is disposed; and a first-fourth housing hole in which a second-second coil facing the second-second magnet of the second driving unit is disposed.

On the other hand, a camera actuator according to an embodiment includes a housing; a prism unit disposed in the housing; a driving unit for tilting the prism unit; and a ball bearing, wherein the prism unit includes a recess for receiving the ball bearing; wherein the housing includes a pulling member for generating electromagnetic attractive force with the ball bearing, and wherein the prism unit is tilted based on the ball bearing.

In addition, the ball bearing is made of a magnetic material, and the pulling member is made of a magnet.

In addition, the ball bearing is made of a magnet, and the pulling member is made of a magnetic material.

On the other hand, a camera actuator according to an embodiment includes a housing; a prism mover disposed in the housing; a prism disposed on the prism mover; a first driving unit disposed on the prism mover; a second driving unit opposite to the first driving unit; and a guide portion disposed in the housing and guiding the tilting of the prism mover, wherein the prism mover includes a fastening portion on which the guide portion is disposed, and the guide portion has an arc shape.

In addition, the fastening portion includes a hole in which the guide portion is inserted.

In addition, a cross-section of the guide portion includes a circular shape.

In addition, the prism mover is tilted at a predetermined interval in a first direction with respect to a center of the guide portion.

In addition, the first driving unit includes first to third magnets, and the second driving unit includes first to third coils.

In addition, the first magnet is disposed on a first side surface of the prism mover, the second magnet is disposed on a second side surface facing the first side surface of the prism mover, and the third magnet is disposed on an inclined surface of the prism mover.

In addition, the first coil of the second driving unit corresponds to the first magnet of the first driving unit, the second coil of the second driving unit corresponds to the second magnet of the first driving unit, and the third coil of the second driving unit corresponds to the third magnet of the first driving unit.

In addition, the fastening portion is disposed on the inclined surface of the prism mover.

In addition, the prism mover includes a seating portion disposed on the inclined surface, and the third magnet is disposed on the seating portion.

In addition, the first magnet and the second magnet allow the prism mover to tilt in the first direction, and the third magnet allows the prism mover to tilt in a second direction perpendicular to the first direction.

In addition, a normal line of the first side surface is parallel to a normal line of the second side surface, and a normal line of the first side surface or the second side surface is orthogonal to a normal line of the inclined surface.

In addition, one side and the other side of the guide portion are coupled to the housing, and a central region of the guide portion is spaced apart from the housing.

In addition, the housing includes a first groove formed in a sidewall and a second groove spaced apart from the first groove, the one side of the guide portion is coupled to the first groove, the other side is coupled to the second groove.

In addition, cross-sections of the first groove and the second groove are formed in a 'v' shape.

In addition, the camera actuator comprises an adhesive member disposed between one side of the guide portion and the first groove and between the other side of the guide portion and the second groove.

In addition, the guide portion is closer to the housing toward the one side or the other side from the central region.

In addition, a linear distance between the one side and the other side of the guide portion is formed to be shorter than the length of the first direction of the prism mover.

In addition, a radius of the hole of the fastening portion is formed to be larger than a radius of the cross-section of the guide portion.

In addition, a length in the first direction of the fastening portion is formed to be greater than a difference between the radius of the hole of the fastening portion and the radius of the cross-section of the guide portion.

In addition, the camera actuator of the embodiment includes a substrate disposed on the housing, and the second driving unit is disposed on the substrate.

In addition, the substrate includes first to third surfaces opposite to the first to third sidewalls, respectively, the first coil is disposed on the first surface of the substrate, and the second coil is disposed on the second surface of the substrate, and the third coil is disposed on the third surface of the substrate.

In addition, at least a part of the guide portion overlaps with the third coil in the second direction.

In addition, the guide portion is disposed at a higher position than the first driving unit and the second driving unit.

In addition, the guide portion is formed of a non-magnetic material.

In addition, the camera actuator of the embodiment includes a yoke disposed between the first driving unit and the prism mover.

Advantageous Effects

According to an embodiment, there is a technical effect that it is possible to provide an ultra-thin and ultra-small camera actuator and a camera module including the same.

For example, according to the embodiment, a driving unit is disposed so as to utilize a space below the prism unit and overlap each other, and thus there is a technical effect that it is possible to provide an ultra-thin and ultra-small camera actuator and a camera module including the same.

For example, according to the embodiment, there is a technical effect that occurrence of a decenter or tilt phenomenon may be minimized to achieve the best optical characteristics when the OIS is implemented by tilt-controlling the prism unit to a first axis or a second axis by an electromagnetic force which is the driving force of the driving unit in a state in which a ball bearing is disposed, and the ultra-thin and ultra-small camera actuator may be implemented.

In addition, according to the embodiment, there is a technical effect that it is possible to provide a camera actuator capable of securing a sufficient amount of light and a camera module including the same by eliminating lens size limitation of an optical system lens assembly when the OIS is implemented.

For example, according to the embodiment, by arranging both driving units for tilting the prism unit in two or more axes on both sides of the prism unit, it is possible to solve the size limitation of the lens in the lens assembly of the optical system when implementing OIS, and there is a technical effect of providing a camera actuator capable of securing a sufficient amount of light and a camera module including the same.

In addition, according to the embodiment, the prism unit is tilt-controlled to a first axis or a second axis by electromagnetic force between the first and second magnets disposed on the prism mover and the first and second coils disposed on the circuit board of the driving unit. Accordingly, there is a technical effect of minimizing the occurrence of a decent or a tilt phenomenon when implementing OIS and exhibiting the best optical characteristics.

In addition, according to the embodiment, a ball bearing serving to tilt the prism unit in multiple axes is formed of a magnetic material, so that the ball bearing may serve as an axis for tilting the prism unit, and may also serve as a fixing role for fixing the prism unit to the housing, and accordingly, there is a technical effect that the number of parts and the unit price of the parts may be reduced.

In addition, according to the embodiment, there is a technical effect that it is possible to provide a camera actuator capable of achieving the best optical characteristics and a camera module including the same by minimizing occurrence of a decenter or tilt phenomenon when the OIS is implemented.

For example, according to the embodiment, the driving unit stably disposed on the housing is provided, and the prism unit is tilt-controlled to the first axis or the second axis, and thus there is a technical effect that it is possible to achieve the best optical characteristics by minimizing occurrence of a decenter or tilt phenomenon when the OIS is implemented.

In addition, according to the embodiment, there is a technical effect that it is possible to provide a camera actuator capable of implementing the OIS with low power consumption and a camera module including the same.

For example, according to the embodiment, unlike the conventional method of moving a plurality of solid lenses, the OIS is implemented by including the driving unit and tilt-controlling the prism unit to the first axis or the second axis, and thus there is a technical effect that it is possible to provide a camera actuator capable of implementing the OIS with low power consumption and a camera module including the same.

DESCRIPTION OF DRAWINGS

FIG. 1 is a perspective view of a camera module according to a first embodiment.

FIG. 2a is a perspective view in which a case is omitted in the camera module according to the first embodiment shown in FIG. 1.

FIG. 2b is an exploded perspective view of the camera module according to the first embodiment shown in FIG. 2a.

FIG. 3a is a perspective view of a second camera actuator of a camera module according to the first embodiment shown in FIG. 2b.

FIG. 3b is an exploded perspective view of a second camera actuator according to the first embodiment shown in FIG. 3a.

FIG. 4a is a perspective view of a driving unit of a second camera actuator according to the first embodiment shown in FIG. 3b.

FIG. 4b is an exploded perspective view of a driving unit of the second camera actuator shown in FIG. 4a.

FIG. 5a is a perspective view of a prism unit in the second camera actuator of the first embodiment shown in FIG. 3b.

FIG. 5b is an exploded perspective view of the prism unit shown in FIG. 5a.

FIG. 5c is an exploded perspective bottom view of the prism unit shown in FIG. 5b.

FIG. 6a is a front perspective view of a housing of a second camera actuator.

FIG. 6b is a rear perspective view of the housing of the second camera actuator.

FIG. 7 is a perspective view with some components removed from the second camera actuator.

FIG. 8 is a vertical cross-sectional view taken along line A-A of the second camera actuator in the first embodiment shown in FIG. 7.

FIGS. 9a and 9b are views showing a modified example of the arrangement position of the pulling magnet according to the first embodiment.

FIGS. 10a and 10b are diagrams illustrating an operation of a second camera actuator according to the first embodiment.

FIG. 11 is a perspective view of a second camera actuator according to the second embodiment.

FIG. 12 is an exploded perspective view of a second camera actuator according to the second embodiment.

FIG. 13 is a cross-sectional view in a y-z plane of the second camera actuator according to the second embodiment.

FIG. 14 is a cross-sectional view in a x-z plane of the second camera actuator according to the second embodiment.

FIG. 15 is a perspective view of a partial configuration of a second camera actuator according to the second embodiment.

FIGS. 16 and 17 are operation diagrams of a second camera actuator according to the second embodiment.

FIG. 18 is a perspective view of a first camera actuator according to an embodiment.

FIG. 19 is a perspective view in which a part of a configuration is omitted in a camera actuator according to the embodiment shown in FIG. 18.

FIG. 20 is an exploded perspective view in which a part of the configuration is omitted in the camera actuator according to the embodiment shown in FIG. 18.

FIG. 21 is a perspective view of a first guide portion and a second guide portion in the camera actuator according to the embodiment shown in FIG. 20.

FIG. 22a is a perspective view of a first lens assembly in the camera actuator according to the embodiment shown in FIG. 20.

FIG. 22b is a perspective view in which a part of a configuration is removed in the first lens assembly shown in FIG. 22a.

FIG. 23 is a driving example view of a camera actuator according to an embodiment.

FIG. 24 is a cross-sectional view taken along line C1-C2 in the camera actuator according to the embodiment shown in FIG. 18.

FIG. 25a is an enlarged view of the S region shown in FIG. 24.

FIG. 25b is a detailed view of the S region shown in FIG. 24,

FIG. 25c shows magnetic flux data according to a separation distance between a magnet and a position detection sensor in Example and Comparative Example.

FIG. 26a is a perspective view of a first driving unit 116 in a camera module according to an embodiment.

FIG. 26b shows data of a magnetic flux density distribution in Comparative Example.

FIG. 26c shows data of a magnetic flux density distribution in Example.

FIG. 27 is an illustrative view of an integrated body of a camera module according to another embodiment.

FIG. 28 is a perspective view of a mobile terminal to which a camera module according to an embodiment is applied.

FIG. 29 is a perspective view of a vehicle to which a camera module according to an embodiment is applied.

DETAILED DESCRIPTION OF THE EMBODIMENTS

Hereinafter, embodiments will be described in detail with reference to the accompanying drawings. While the invention may be modified in various ways and take on various alternative forms, specific embodiments thereof are shown in the drawings and described in detail below as examples. There is no intent to limit the invention to the particular forms disclosed. On the contrary, the invention is to cover all modifications, equivalents, and alternatives falling within the spirit and scope of the appended claims.

Although the terms "first," "second," etc. may be used to describe various elements, these elements should not be limited by these terms. These terms are only used to distinguish one element from another. In addition, terms defined specially in consideration of a configuration and operation of the embodiment are only for describing the embodiment, and do not limit the scope of the embodiment.

In describing the embodiments, when elements are described with terms "above (up) or below (down)", "front (head) or back (rear)", the terms "above (up) or below (down)", "front (head) or back (rear)" may include both meanings that two elements are in direct contact with each other, or one or more other components are disposed between the two elements to form. Further, when expressed as "on (over)" or "under (below)", it may include not only the upper direction but also the lower direction based on one element.

In addition, relational terms such as "on/above" and "under/below" used below do not necessarily require or imply any physical or logical relationship or order between such entities or elements, and may be used to distinguish any entity or element from another entity or element.

First Embodiment

FIG. 1 is a perspective view of a camera module 1000A according to a first embodiment, FIG. 2a is a perspective view in which a case 1000 is omitted in the camera module 1000A according to the first embodiment shown in FIG. 1, and FIG. 2b is an exploded perspective view of the camera module 1000A according to the first embodiment shown in FIG. 2a.

Referring to FIGS. 1, 2a and 2b, a camera module 1000A according to a first embodiment may include a plurality of camera actuators. For example, the camera module 1000A according to the first embodiment may include a first camera actuator 100 and a second camera actuator 300. The first embodiment may include a case 1000 that protects the first camera actuator 100 and the second camera actuator 300.

The first camera actuator 100 may be electrically connected to a first circuit board 410, and the second camera actuator 300 may be electrically connected to a second circuit board (not shown). The first circuit board 410 and the second circuit board may also be electrically connected.

The first camera actuator 100 supports one or a plurality of lenses, and may move the lenses up and down according to a control signal of a predetermined control unit to perform an autofocusing function or zoom function. The first camera actuator 100 may be a lens driving device.

In addition, the second camera actuator 300 may be an optical image stabilizer (OIS) actuator. The second camera actuator 300 may be a prism driving device. In this case, light incident from the outside may be incident on the second camera actuator 300. Further, the light incident on the second camera actuator 300 may be incident on the first camera actuator 100 due to a change in a light path, and the light passing through the first camera actuator 100 may be incident on an optical sensor (not shown).

Hereinafter, the CAIS actuator or the prism driving device, which is the second camera actuator 300, will be mainly described.

FIG. 3a is a perspective view of a second camera actuator 300 of a camera module according to the first embodiment shown in FIG. 2b, and FIG. 3b is an exploded perspective view of a second camera actuator 300 according to the first embodiment shown in FIG. 3a.

Referring to FIG. 3, a second camera actuator 300 according to a first embodiment may include a housing 310, a driving unit 320 disposed on the housing 310, and a prism unit 330 disposed on the image shake control unit 320.

In addition, the second camera actuator 300 may further include a cover member 301. The cover member 301 may include an accommodating space therein, and at least one side surface of the cover member 301 may be open. As an example, the cover member 301 may have a structure in which a plurality of side surfaces connected to each other are open. In detail, the cover member 301 may have a structure in which a front surface on which light is incident from the outside, a lower surface corresponding to the first camera actuator 100, and a rear surface opposite to the front surface are open, and may provide a moving path of light of the prism unit 330 which will be described later.

The cover member 301 may include a rigid material. As an example, the cover member 301 may include a material such as resin or metal, and may support the housing 310 disposed in the accommodating space. For example, the cover member 301 is disposed surrounding the housing 310, the driving unit 320, the prism unit 330, etc., and may support the configurations.

In detail, the prism unit 330, which will be described later, may be moved in a first direction and/or a second direction by the driving unit 320. At this time, the cover member 301 may fix the housing and the driving unit 320 at a set position, and may provide a more accurate moving path of light. In addition, the cover member 301 may prevent the housing 310 from being departed to the outside of the second camera actuator 300 by an attractive force acting between the ball bearing 350 and the pulling magnet 360. The cover member 301 may be omitted according to dispositional relationship of the housing 310, the driving unit 320, and the prism unit 330.

Meanwhile, in the first embodiment, the pulling magnet 360 may be a pulling member. At this time, the pulling member may be made of a magnet as described above. In this case, when the pulling member is made of a magnet, the ball bearing 350 may be made of a magnetic material. Alternatively, the pulling member may be made of a magnetic material. In addition, when the pulling member is made of a magnetic material, the ball bearing 350 may be made of a magnet. That is, in the first embodiment, the ball bearing 350 and the pulling member, which is a member generating attractive force, may be the pulling magnet 360 as described above, or alternatively, may be a pulling magnetic material (not shown).

Drawings related to FIG. 4 are perspective views of each configuration of the second camera actuator.

Referring to the drawing related to FIG. 4, the second camera actuator 300 may include the housing 310, the driving unit 320 and the prism unit 330. In detail, the driving unit 320 may include a circuit board 321 of the driving unit, a first driving unit 322 and a second driving unit 323, and the prism unit 330 may include a prism 331 and the prism mover 333.

According to the first embodiment, the driving unit 320 is provided, which is disposed on the housing 310, and thus there is a technical effect that it is possible to provide an ultra-thin and ultra-small camera actuator and a camera module including the same.

In addition, according to the first embodiment, the driving unit 320 is disposed below the prism unit 330, and thus there is a technical effect that when the OIS is implemented, lens size limitation of an optical system lens assembly may be eliminated, and a sufficient amount of light may be secured.

In addition, according to the first embodiment, the driving unit 320 stably disposed on the housing 310 is provided to tilt-control the prism unit 330 to a first axis or a second axis, and thus there is a technical effect that occurrence of a decenter or tilt phenomenon may be minimized to achieve the best optical characteristics when the OIS is implemented.

Further, according to the first embodiment, unlike the conventional method of moving a plurality of solid lenses, the OIS is implemented by including the driving unit 320 and tilt-controlling the prism unit 330 to a first axis or a second axis, and thus there is a technical effect that the OIS may be implemented with low power consumption.

Hereinafter, each configuration of the second camera actuator 300 will be described in detail with reference to the drawings related FIG. 4.

<Driving Unit>

FIG. 4a is a perspective view of a driving unit 320 of a second camera actuator 300 according to the first embodiment shown in FIG. 3b, and FIG. 4b is an exploded perspective view of a driving unit 320 of the second camera actuator 300 shown in FIG. 4a.

Referring to FIGS. 4a and 4b, the driving unit 320 may include a driving unit circuit board 321, a first driving unit 322, a second driving unit 323, and a Hall sensor 324. In addition, the first driving unit 322 may include a first-first coil 322C1, a first-second coil 322C2, a first-first magnet 322M1, and a first-second magnet 322M2. Also, the second driving unit 323 may include a second-first coil 323C1, a second-second coil 323C2, a second-first magnet 323M1, and a second-second magnet 323M2.

Also, the Hall sensor 324 may include a first Hall sensor 324H1 and a second Hall sensor 324H2.

The driving unit circuit board 321 is connected to a predetermined power supply unit (not shown), and may be applied to the first-first coil 322C1, the first-second coil 322C2, the second-first coil 323C1, and the second-second coil 323C2. The driving unit circuit board 321 may be include a circuit board having a wiring pattern that can be electrically connected, such as a rigid printed circuit board (Rigid PCB), a flexible printed circuit board (Flexible PCB), and a rigid flexible printed circuit board (Rigid Flexible POB). Preferably, the driving unit circuit board 321 may be a flexible printed circuit board (Flexible PCB), In addition, at least one point of the driving unit circuit board 321 may be bent to be disposed on a plurality of surfaces of the prism unit 330.

Accordingly, the driving unit circuit board 321 may be include a first substrate region 321S1, a second substrate region 321S2 bent from one end of the first substrate region 321S1, and a third substrate region 321S3 bent from the other end of the first substrate region 321S1. That is, the driving unit circuit board 321 may have a '⊏' shape.

Each of the first driving unit 322 and the second driving unit 323 may include a coil unit and a magnet unit.

The coil units of the first driving unit 322 and the second driving unit 323 may include the first-first coil 322C1, the first-second coil 322C2, the second-first coil 323C1, and the second-second coil 323C2.

In addition, the magnet units of the first driving unit 322 and the second driving unit 323 may include the first-first magnet 322M1, the first-second magnet 322M2, the second-first magnet 323M1, and the second-second magnet 323M2.

The first-first coil 322C1, the first-second coil 322C2, the second-first coil 323C1, and the second-second coil 323C2 constituting the coil unit may be electrically connected to the driving unit circuit board 321.

The first-first coil 322C1 and the first-second coil 322C2 may be disposed to be spaced apart from each other. Also, the second-first coil 323C1 and the second-second coil 323C2 may be disposed to be spaced apart from each other.

The first-first coil 322C1 and the first-second coil 322C2 may be respectively disposed in a substrate region facing each other among a plurality of substrate regions of the driving unit circuit board 321. That is, the first-first coil 322C1 may be disposed in the second substrate region 321S2 of the driving unit circuit board 321. In addition, the first-second coil 322C2 may be disposed in the third substrate region 322C2 facing the second substrate region 321S2.

In addition, the second-first coil 323C1 and the second-second coil 323C2 may be respectively disposed in a substrate region facing each other among a plurality of substrate regions of the driving unit circuit board 321. That is, the second-first coil 323C1 may be disposed in the third substrate region 321S2 of the driving unit circuit board 321. In addition, the second-second coil 323C2 may be disposed in the third substrate region 322C2 facing the second substrate region 321S2.

The first-first coil 322C1 and the first-second coil 322C2 constituting the first driving unit 322 may be horizontally wound on the driving unit circuit board 321. That is, the first-first coil 322C1 and the first-second coil 322C2 constituting the first driving unit 322 may have a horizontal width greater than a vertical width on the driving unit circuit board 321.

The second-first coil 323C1 and the second-second coil 323C2 constituting the second driving unit 323 may be vertically wound on the driving unit circuit board 321. That is, the second-first coil 323C1 and the second-second coil 323C2 constituting the second driving unit 323 may have a vertical width greater than a horizontal width on the driving unit circuit board 321.

The magnet units of the first driving unit 322 and the second driving unit 323 may include the first-first magnet 322M1, the first-second magnet 322M2, the second-first magnet 323M1, and the second-second magnet 323M2.

That is, the magnet unit may include a first-first magnet 322M1 disposed in a region corresponding to the first-first coil 322C1; a first-second magnet 322M2 disposed in a region corresponding to the first-second coils 322C2; a second-first magnet 323M1 disposed in a region corresponding to the second-first coil 323C1, and a second-second magnet 323M2 disposed in a region corresponding to the second-second coil 323C2.

The first-first magnet 322M1, the first-second magnet 322M2, the second-first magnet 323M1, and the second-second magnet 323M2 are disposed in the prism unit 330. In this case, the prism unit 330 includes a plurality of surfaces. And, the plurality of surfaces of the prism unit 330 includes a first surface (described later) facing the second substrate region 321S2; and a second surface (described later) disposed opposite to the first surface and facing the third substrate region 321S3. And, the first-first magnet 322M1 and the first-second magnet 322M2 may be disposed on the first surface of the prism unit 330, and the second-first magnet 323M1 and the second-second magnet 323M2 may be disposed on the second surface of the prism unit 330.

The first-first magnet 322M1, the first-second magnet 322M2, the second-first magnet 323M1, and the second-second magnet 323M2 may have different magnetization methods. For example, the first-first magnet 322M1 and the first-second magnet 322M2 may be vertically magnetized. In addition, the second-first magnet 323M1 and the second-second magnet 323M2 may be horizontally magnetized. The N pole and the S pole of the first-first magnet 322M1 and the first-second magnet 322M2 may be vertically magnetized to face the first-first coil 322C1 and the first-second coil 322C2, respectively. In addition, the N pole and the S pole of the second-first magnet 323M1 and the second-second magnet 323M2 may be horizontally magnetized to face the second-first coil 323C1 and the second-second coil 323C2, respectively.

Meanwhile, the first driving unit 322 provides a driving force for tilting the prism unit 330 in a Y-axis direction perpendicular to a ground. In addition, the second driving unit 323 provides a driving force for tilting the prism unit 330 in a X-axis direction parallel to the ground.

In this case, in the general two-axis driving method, each of the first driving unit 322 and the second driving unit 323 is disposed in different regions of the driving unit circuit board 321. For example, in the related art, the first driving unit 322 is disposed in the first substrate region 321S1 of the driving unit circuit board 321, and the second driving unit 323 is disposed in the second substrate region 321S2 and the third substrate region 321S3 of the driving unit circuit board 321. Accordingly, in the prior art, the first driving unit 322 and the second driving unit 323 occupied a certain volume in the vertical direction as well as the horizontal direction of the camera module. In contrast, in the first embodiment, the first driving unit 322 and the second driving unit 323 are disposed in a second substrate region 321S2 and a third substrate region 321s3 corresponding to both sides of the driving unit circuit board 321. Accordingly, the first driving unit 322 and the second driving unit 323 in the first embodiment can reduce the volume in the vertical direction while maintaining the volume in the horizontal direction compared to the conventional camera module.

The driving unit 320 may further include a Hall sensor 324. For example, the Hall sensor 324 may include a first Hall sensor 324H1 disposed inside any one of the first-first coil 322C1 and the first-second coil 322C2 constituting the first driving unit 322. In addition, the Hall sensor 324 may include a second Hall sensor 324H2 disposed inside any one of the second-first coil 323C1 and the second-second coil 323C2 constituting the second driving unit 323.

According to the first embodiment, the prism unit 330 is tilt-controlled in the first axis or the second axis by electromagnetic force between the first-first coil 322C1, the first-second coil 322C2, the second-first coil 323C1 and the second-second coil 323C2, the first-first magnet 322M1, the first-second magnet 322M2, the second-first magnet 323M1, and the second-second magnet 323M2 constituting the first driving unit 322 and the second driving unit 323. Accordingly, when implementing GIS, there is a technical effect of minimizing the occurrence of a decent or a tilt phenomenon to obtain the best optical characteristics.

<Prism Unit>

FIG. 5a is a perspective view of a prism unit 330 in the second camera actuator of the first embodiment shown in FIG. 3b, FIG. 5b is an exploded perspective view of the prism unit 330 shown in FIG. 5a, and FIG. 5c is an exploded perspective bottom view of the prism unit 330 shown in FIG. 5b.

Referring to FIGS. 5a to 5c, the prism unit 330 in the second camera actuator of the first embodiment may include a prism mover 333 having a receiving portion 333A, and a prism 331 disposed on the receiving portion 333A of the prism mover 333.

The prism unit 330 may include the prism 331 and the prism mover 333 disposed on the prism 331.

The prism 331 may be a right-angle prism. The prism 331 may reflect a direction of light incident from the outside. That is, the prism 331 may change a path of light incident on the second camera actuator 300 from the outside toward the first camera actuator 106.

The prism mover 333 may be disposed on the prism 331. The prism mover 333 may be disposed surrounding the prism 331. At least one side surface of the prism mover 333 may be open, and may include an accommodating space therein. In detail, the prism mover 333 may have a structure in which a plurality of outer surfaces connected to each other are open. As an example, the prism mover 333 may have a structure in which an outer surface corresponding to the prism 331 is open, and may include a receiving portion 333A defined as a first space 335.

The prism mover 333 may include an inner surface 335S. The inner surface 335S may be an inner surface forming the first space 335. The first space 335 may have a shape corresponding to the prism 331. The inner surface 335S of the first space 335 may be in direct contact with the prism 331.

The prism mover 333 may include a step 326. The step 326 may be disposed in the first space 335. The step 326 may function to guide the prism 331 and/or as a seating portion. In detail, a protruding portion corresponding to the step 326 may be formed on the outside of the prism 331. The prism 331 may be disposed in the first space 335 with the protruding portion being guided by the step 326 of the prism mover 333. Accordingly, the prism mover 333 may effectively support the prism 331. In addition, the prism 331 may be seated at a set position, and may have improved alignment characteristics in the prism mover 333.

The prism unit 330 may include a plurality of outer surfaces. For example, the prism mover 333 of the prism unit 330 may include a plurality of outer surfaces. The prism mover 333 may include a plurality of outer surfaces corresponding to the plurality of inner surfaces of the housing 310.

For example, the prism mover 333 may include a first outer surface 330S1 corresponding to the first inner surface 310S1 (refer to FIG. 6a) of the housing 310, a second outer surface 330S2 (refer to FIG. 6a) corresponding to the second inner surface 310S2 of the housing 310, a third outer surface 330S3 (refer to FIG. 6a) corresponding to the third inner surface 310S3 of the housing 310, and a fourth outer surface 330S4 (refer to FIG. 6a) corresponding to the fourth inner surface 310S4 of the housing 310.

The prism mover 333 may include at least one groove. For example, a groove may be disposed on at least one outer surface of the prism mover 333. In detail, the groove may be disposed on the fourth outer surface 330S4 of the prism mover 333. The groove may have a concave shape in the first space 335 direction (z-axis direction) on the fourth outer surface 330S4.

The groove of the prism mover 333 may include a fifth groove 333R5.

The fifth groove 333R5 may be disposed in a central region of the fourth outer surface 330S4. In detail, the fifth groove 333R5 may overlap the center of the fourth outer surface 330S4 in the z-axis direction. The fifth groove 333R5 may be disposed to face a second hole 313H (refer to FIG. 6A), which will be described later. In other words, the center of the fifth groove 333R5 may be aligned with the center of the second housing hole 313H, which will be described later (see FIG. 6A) in the z-axis direction.

Also, the fifth groove 333R5 may be disposed in a region overlapping the center of the prism unit 330 in the z-axis direction.

The fifth groove 333R5 may provide a space in which the ball bearing 350 is disposed. In this case, the fifth groove 333R5 may be formed to have a depth smaller than the diameter of the ball bearing 350. Accordingly, when the ball bearing 350 is disposed in the fifth groove 333R5, a part of the ball bearing 350 may be inserted in the fifth groove 333R5, and the remaining part may protrude to the outside of the prism mover 333.

In this case, the fifth groove 333R5 may have a shape in which the width gradually decreases from the fourth outer surface 333S4 to the inside. That is, a side surface of the fifth groove 333R5 may have an inclined surface whose width gradually increases as the distance from the bottom surface of the fifth groove 333R5 increases.

Accordingly, the fifth groove 333R5 may guide the tilting of the prism unit 330 in the x-axis or the y-axis with respect the ball bearing 350.

The prism mover 333 may include a plurality of recesses. The recess may be a groove having a concave shape on the outer surface of the prism mover 333 in the direction of the first space 335. The plurality of recesses may include a first recess 333R1, a second recess 333R2, a third recess 333R3, and a fourth recess 333R4.

For example, the first recess 333R1 may be disposed on the first outer surface 333S1 of the prism mover 333. The first recess 333R1 may be disposed in a region corresponding to the first-first housing hole 311H1 disposed in the housing 310.

Also, the second recess 333R2 may be disposed on the first outer surface 333S1 of the prism mover 333. The second recess 333R2 may be disposed on the first outer surface 333S1 at a position spaced apart from the first recess 333R1 by a predetermined distance. The second recess 333R2 may be disposed in a region corresponding to the first-second housing hole 311H2 disposed in the housing 310.

The third recess 333R3 may be disposed on the second outer surface 333S2 of the prism mover 333. The third recess 333R3 may be disposed in a region corresponding to the first-third housing hole 311H3 disposed in the housing 310.

The fourth recess 333R4 may be disposed on the second outer surface 333S2 of the prism mover 333. The fourth recess 333R4 may be disposed to be spaced apart from the third recess 333R3 by a predetermined distance on the second outer surface 333S2. The fourth recess 333R3 may be disposed in a region corresponding to the first to fourth housing holes 311H4 disposed in the housing 310.

That is, the first recess 333R1 may correspond to the first-first coil 322C1 of the first driving unit 322, and the second recess 333R2 may correspond to the second-first coil 323C1 of the second driving unit 323, the third recess 333R3 may correspond to the first-second coil 322C2 of the first driving unit 322, and the fourth recess 333R4 may correspond to the second-second coil 323C2 of the driving unit 323.

Magnets may be respectively disposed in the first recess 333R1, the second recess 333R2, the third recess 333R3, and the fourth recess 333R4.

That is, the first-first magnet 322M1 may be disposed in the first recess 333R1. In addition, the second-first magnet 323M1 may be disposed in the second recess 333R2. Also, the first-second magnet 322M2 may be disposed in the third recess 333R3. In addition, the second-second magnet 323M2 may be disposed in the fourth recess 333R4.

As described above, the first recess 333R1, the second recess 333R2, the third recess 333R3, and the fourth recess 333R4 are only disposed on the first outer surface 333S1 and the second outer surface 333S2 of the prism mover 333 and, and accordingly, it is possible to dramatically reduce the thickness in the y-axis direction while maintaining the thickness in the x-axis direction for the magnet to be disposed as compared to the prior art.

Meanwhile, a ball bearing 350 is disposed in the fifth groove 333R5. The ball bearing 350 may be a tilting axis for tilting the prism unit 330. To this end, an adhesive member (not shown) for fixing the ball bearing 350 may be disposed on the fifth groove. In addition, the ball bearing 350 may be fixed and disposed in the fifth groove 333R5 by the adhesive member. For example, an epoxy may be used as the adhesive member. The ball bearing 350 may be a magnetic material. Preferably, the ball bearing 350 may generate attractive force to each other with the pulling magnet 360 to be described later. That is, an attractive force acts between the ball bearing 350 and the pulling magnet 360. Accordingly, the prism unit 330 is may rotate about a first axis (x-axis) and/or a second axis (y-axis) by the driving force of the driving unit 320 in contact with the housing 310 by the ball bearing 350. Meanwhile, the ball bearing 350 and the pulling magnet 360 may generate the attractive force at positions spaced apart from each other by a predetermined distance. Also, differently from this, the ball bearing 350 and the pulling magnet 360 may be in point contact with each other by the generated attractive force. In addition, the ball bearing 350 may rotate in a first axis and/or a second axis by a driving force generated by the driving unit 320 in a state in point contact with the pulling magnet 360.

The first embodiment comprises the ball bearing 350 as a magnetic material as described above, so that an attractive force is generated between the ball bearing 350 and the pulling magnet 360, and accordingly, the ball bearing 350 is stably supported by the housing 310 to rotate in multiple axes of the prism unit 330. In addition, in the first embodiment, the ball bearing 350 itself, which serves as the axis of rotation of the prism unit 330 and guides the rotation, is made of a magnetic material. Accordingly, it is possible to remove a component such as an additional pulling yoke for attaching the prism unit 330 to the housing 310, and it is possible to achieve a reduction in the number of parts and a reduction in the cost of parts.

<Housing>

FIG. 6a is a front perspective view of a housing 310 of a second camera actuator 300, and FIG. 6b is a rear perspective view of the housing 310 of the second camera actuator 300.

Referring to FIGS. 6a and 6b, the housing 310 may include an accommodating space for accommodating the prism unit 330. The housing 310 may include a plurality of inner surfaces. For example, the housing 310 may include a first inner surface 310S1 corresponding to the second substrate region 321S2 of the driving unit circuit board 321, a second inner surface 310S2 corresponding to the third substrate region 321S3 of the driving unit circuit board 321, and a third inner surface 310S3 corresponding to the first substrate region 321S1 of the driving unit circuit board 321.

In detail, the housing 310 may be included a first inner surface 310S1 corresponding to the first-first coil 322C1 and the second-first coil 323C1, and a second inner surface 310S2 correspoinding to the first-second coil 322C2 and the second-second coil 322C2.

In addition, the housing 310 may include a fourth inner surface 310S4 connected to the first inner surface 310S1 and the second inner surface 310S2 and connected to the third inner surface 310S3.

The housing 310 may include a plurality of first housing holes 311H. The first housing hole 311H may be a through hole passing the outer and inner surfaces of the housing 310. The plurality of first housing holes 311H may include first-first to first-fourth housing holes 311H1, 311H2, 311H3, and 311H4. The first-first housing hole 311H1 and the first-second housing hole 311H2 may be through holes passing through the first inner surface 310S1 and an outer surface corresponding to the first inner surface 310S1. The first-third housing hole 311H3 and the first-fourth housing hole 311H4 may be through holes passing through the second inner surface 310S2 and an outer surface corresponding to the second inner surface 310S2.

The first-first housing hole 311H1 may be disposed in a region corresponding to the first-first coil 322C1. Also, the first-first housing hole 311H1 may have a size and shape corresponding to the first-first coil 322C1. Accordingly, the first-first coil 322C1 may be partially or completely inserted and disposed in the first-first housing hole 311H1.

The first-second housing hole 311H2 may be disposed in a region corresponding to the second-first coil 323C1. Also, the first-second housing hole 311H2 may have a size and shape corresponding to the second-first coil 323C1. Accordingly, the second-first coil 323C1 may be partially or completely inserted and disposed in the first-second housing hole 311H2.

The first-third housing hole 311H3 may be disposed in a region corresponding to the first-second coil 322C2. In addition, the first-thrid housing hole 311H3 may have a size and shape corresponding to the first-second coil 322C2. Accordingly, the first-second coil 322C2 may be partially or completely inserted and disposed in the first-third housing hole 311H3.

The first-fourth housing hole 311H4 may be disposed in a region corresponding to the second-second coil 323C2. Also, the first-fourth housing hole 311H4 may have a size and shape corresponding to the second-second coil 323C2.

Accordingly, the second-second coil 323C2 may be partially or completely inserted and disposed into the first-fourth housing hole 311H4.

The housing 310 may further include at least one second housing hole. The second housing hole 313H may be a through hole penetrating the outer and inner surfaces of the housing 310. For example, a hole may be disposed on at least an inner surface of the housing 310. In detail, the second housing hole 313H may be disposed on the fourth inner surface 310S4. The second housing hole 313H may have a shape passing through the fourth inner surface 310S4 in the outer surface direction (z-axis direction) of the housing 310.

The second housing hole 313H may be formed by communicating with a plurality of grooves. Preferably, a first portion 313H1 of the second housing hole 313H may be disposed on the fourth inner surface 310S4. In addition, a second portion 313H2 communicating with the first portion 313H1 may be disposed on an outer surface opposite to the fourth inner surface 310S4.

The first portion 313H1 and the second portion 313H2 may have different shapes or sizes. The first portion 313H1 may have a shape corresponding to the ball bearing 350. The first portion 313H1 may be disposed on the fourth inner surface 310S4 of the housing 310 to be aligned with the ball bearing 350 disposed on the prism unit 330 in the z-axis direction. Preferably, a center of the first portion 313H1 may overlap a center of the ball bearing 350 in the z-axis direction. At least a part of the ball bearing 350 may be inserted in the first portion 313H1. Accordingly, the first portion 313H1 may be referred to as a ball bearing insertion portion into which the ball bearing 350 is inserted.

The second portion 313H2 of the second housing hole 313H communicating with the first portion 313H1 of the second housing hole 313H may be disposed on an outer surface corresponding to the fourth inner surface 310S4. The second portion 313H2 may have a size different from that of the first portion 313H1. Preferably, the second portion 313H2 may have a shape and size corresponding to the pulling magnet 360.

A center of the first portion 313H1 may be aligned with a center of the second portion 313H2 in the z-axis direction. That is, the center of the first portion 313H1 may overlap the center of the second portion 313H2 in the z-axis direction.

The pulling magnet 360 may be disposed on the second portion 313H2.

In addition, a part of the ball bearing 350 may be disposed in the first portion 313H1. Accordingly, the ball bearing 350 and the pulling magnet 360 may be disposed to face each other through the second housing hole 313H. Preferably, the ball bearing 350 may be inserted in the first portion 313H1 of the second housing hole 313H, and the pulling magnet 360 may be inserted in the second portion 313H2 of the second housing hole 313H. Accordingly, the ball bearing 350 and the pulling magnet 360 may directly contact each other through the second housing hole 313H. For example, the ball bearing 350 may be in point contact with the pulling magnet 360 through the second housing hole 313H. In this case, the pulling magnet 360 may be attached to and fixed to the second portion 313H2 of the second housing hole 313H of the housing 310, In addition, the ball bearing 350 may be fixedly attached to the prism unit 330. At this time, the ball bearing 350 and the pulling magnet 360 are disposed to overlap each other in the z-axis direction. Accordingly, the ball bearing 350 may generate an attractive force to each other with the pulling magnet 360.

That is, the attractive force acts between the ball bearing 350 and the pulling magnet 360. Accordingly, the prism unit 330 may be fixed to the housing 310 by an attractive force between the ball bearing 350 and the pulling magnet 360. In addition, the prism unit 330 may rotate in a first axis (x-axis) direction and/or in a second axis (y-axis) direction with the ball bearing 350 as an axis by the driving force of the image shake control unit 320 in the fixed state by the attractive force between the ball bearing 350 and the pulling magnet 360.

FIG. 7 is a perspective view with some components removed from the second camera actuator 300, Preferably, FIG. 7 is a perspective view showing the second camera actuator 300 in a state in which the cover member 301 and the driving unit circuit board 321 are removed.

Referring to FIG. 7, the pulling magnet 360 according to the first embodiment may be inserted in the second housing hole 313H of the housing 310, Preferably, as described above, a second housing hole 313H is formed in one side of the housing 310.

In this case, the second housing hole 313H may be formed by a combination of a plurality of grooves. That is, it may be an inner surface of one side of the housing 310, preferably a surface facing the fourth outer surface 33354 of the prism mover 333.

In addition, the second housing hole 313H may be disposed to overlap the fifth groove 333R5 of the prism mover 333 in the z-axis direction. That is, the fifth groove 333R5 of the prism mover 333 may be disposed in a central region of the fourth outer surface 33354 of the prism mover 333. In detail, the fifth groove 333R5 may overlap the center of the fourth outer surface 33054 in the z-axis direction. The fifth groove 333R5 may be disposed to face a second hole 313H (refer to FIG. 6A), which will be described later. In other words, the center of the fifth groove 333R5 may be aligned with the center of the described second housing hole 313H in the z-axis direction.

Accordingly, a part of the ball bearing 350 may be inserted in the fifth groove 333R5, and the remaining part may protrude to the outside of the prism mover 333.

In addition, the second housing hole 313H is positioned in a region where the ball bearing 350 protrudes. Specifically, the first portion 313H1 of the second housing hole 313H is positioned in the region where the ball bearing 350 protrudes. Accordingly, the protruding portion of the ball bearing 350 may be inserted in the first portion 313H1 of the second housing hole 313H.

Also, the second housing hole 313H includes the second portion 313H2 communicating with the first portion 313H1. That is, the second housing hole 313H includes a first portion 313H1 formed on the inner surface and a second portion 313H2 formed on the outer surface, and the first portion 313H1 and the second portion 313H2 may be connected or communicated with each other. Preferably, the second housing hole 313H may include a combination of a first groove formed on the inner surface and a second groove formed on the outer surface and communicating with the first groove.

In addition, the pulling magnet 360 is disposed on the second portion 313H2.

At this time, the second portion 313H2 communicates with the first portion 313H1, so that the pulling magnet 360 and the ball bearing 350 may in direct contact with each other and are disposed in the second housing hole 313H. Accordingly, the ball bearing 350 may fix the prism unit 330 to the housing 310 by the attractive force generated together with the pulling magnet 360. In addition, the ball bearing 350 is tilt-controlled to the first axis or the second axis by the driving force of the driving unit 320 in a state in point contact with the pulling magnet 360. Accordingly, the best optical properties can be obtained by minimizing the occurrence of decent or tilt when implementing OIS, and there is a technical effect that can implement an ultra-slim and ultra-small camera actuator.

FIG. 8 is a vertical cross-sectional view taken along line A-A' of the second camera actuator in the first embodiment shown in FIG. 7.

Referring to FIG. 8, the ball bearing 350 is attached to the prism unit 330. Specifically, the ball bearing 350 may be attached in the fifth groove 333R5 of the prism mover 333 constituting the prism unit 330.

In addition, a part of the ball bearing 350 may be inserted in the fifth groove 333R5, and the remaining part may protrude on the housing 310 positioned at the rear of the prism unit 330 in the z-axis direction.

In addition, the second housing hole 313H of the housing 310 is disposed at a position overlapping in the z-axis direction at a position disposed on the ball bearing 350.

In this case, the second housing hole 313H includes the first portion 313H1 of the second housing hole 313H formed in the region facing the ball bearing 350 as described above. The remaining part of the ball bearing 350 may protrude from the prism unit 330 and be inserted into the first portion 313H1 of the second housing hole 313H.

Also, the first portion 313H1 of the second housing hole 313H is connected to the second portion 313H2. That is, the second housing hole 313H may have a single hole shape as the first portion 313H1 and the second portion 313H2 having a groove shape are connected to each other.

In addition, the pulling magnet 360 may be attached to the second portion 313H2. Accordingly, as the pulling magnet 360 and the ball bearing 350 are respectively disposed in the second housing hole 313H, they may be in point contact with each other.

That is, one surface of the pulling magnet 360 is disposed to face the ball bearing 350, and thus may be in point contact with the ball bearing 350. In addition, the other surface of the pulling magnet 360 may be protected by the cover member 301 disposed to surround the periphery of the housing 310. That is, the pulling magnet 360 may be fixedly disposed to the second portion 313H2 of the second housing hole 313H. However, in the environment of the camera module, the pulling magnet 360 may be separated from the second housing hole 313H. Accordingly, Accordingly, in order to prevent separation of the pulling magnet 360, the cover member 301 may be disposed to surround the pulling magnet 360.

Meanwhile, a lubricating member such as grease may be applied to a portion where the ball bearing 350 and the pulling magnet 360 are in contact with each other to minimize frictional force and collect foreign substances by friction.

FIGS. 9a and 9b are views showing a modified example of the arrangement position of the pulling magnet according to the first embodiment.

In FIG. 8, the pulling magnet 360 is disposed on the housing 310, Preferably, the pulling magnet 360 is inserted into and fixed to the second portion 313H2 of the second housing hole 313H of the housing 310.

Alternatively, referring to FIG. 9a, the pulling magnet 360 may be disposed on the cover member 301.

Preferably, the second housing hole 313H may be formed in the housing 310 as described above. However, the pulling magnet 360 is not directly attached to the second housing hole 313H, and it may be inserted into the second portion 313H2 of the second housing hole 313H of the housing 310 while being attached to the cover member 301.

Accordingly, the ball bearing 350 may not directly contact the pulling magnet 360. That is, the ball bearing 350 may contact the housing 310 while being inserted into the first portion 313H1 of the second housing hole 313H.

In addition, the pulling magnet 360 attached to the cover member 301 may be inserted in the second portion 313H2 corresponding to the first portion 313H1, and accordingly, the ball bearing 350 and the pulling magnet 360 may generate attractive force to each other while being spaced apart from each other by a predetermined distance.

Also, referring to FIG. 9B, the pulling magnet 360 may be disposed on the driving unit circuit board 321 instead of the housing 310 and the cover member 301.

For a moment, referring to FIG. 4B, the driving unit circuit board 321 may be include a first substrate region 321S1, a second substrate region 321S2 bent from one end of the first substrate region 321S1, and a third substrate region 321S3 bent from the other end of the first substrate region 321S1. That is, the driving unit circuit board 321 may have a '⊏' shape.

In this case, the driving unit circuit board 321 may have an open front surface, rear surface, and upper surface.

Alternatively, the driving unit circuit board 321 may further include a fourth substrate region 321S4 between the second substrate region 321S2 and the third substrate region 321S3.

In addition, the fourth substrate region 321S4 may be disposed between the housing 310 and the cover member 301.

In addition, the pulling magnet 360 may be attached to the fourth substrate region 321S4.

Preferably, the second housing hole 313H may be formed in the housing 310 as described above. However, the pulling magnet 360 is not directly attached to the second housing hole 313H, but it may be inserted into the second portion 313H2 of the second housing hole 313H of the housing 310 while being attached to the fourth substrate region 321S4 of the driving unit circuit board 321.

In this case, the ball bearing 350 may be disposed to pass through the second housing hole 313H of the housing 310. That is, a part of the ball bearing 350 may be disposed in the fifth groove of the prism mover, another part may be disposed in the second housing hole 313H, and the remaining part may be protruded outside the second housing 310.

In this case, the pulling magnet 360 may be disposed in the fourth substrate region 321S4 of the driving unit circuit board 321 corresponding to the second housing hole 313H, and accordingly, the ball bearing 350 may be in point contact with the pulling magnet 360.

That is, one surface of the pulling magnet 360 is disposed to face the ball bearing 350, and thus may be in point contact with the ball bearing 350.

FIGS. 10a and 10b are diagrams illustrating an operation of a second camera actuator according to the first embodiment.

Referring to FIG. 10, the prism unit 330 according to the first embodiment may be tilt-controlled along the first axis or the second axis by the driving force of the driving unit 320.

First, referring to FIG. 10a, the prism unit 330 may be provided to be capable of rotational movement in a first direction with respect to the first virtual line L1 on which the ball bearing 350 is formed as a reference axis. In detail, the driving unit 320 may rotate the prism unit 330 in a vertical direction.

To this end, the prism unit 330 may receive a driving force through the first driving unit 322.

Specifically, in the first-first coil 322C1 and the first-second coil 322C2 of the first driving unit 322, a current in a forward direction (eg, clockwise) or in a reverse direction (eg, counterclockwise) may be applied. For example, a current may be applied to the first-first coil 322C1 in the x-axis direction, and a magnetic force may be applied to the first-first magnet 322M1 in a direction corresponding to the z-axis direction from the N pole (The direction of the magnetic force can include a positive direction or a negative direction). And, in the state in which the power and current are provided as described above, the electromagnetic force acts in the y-axis direction according to Fleming's left hand rule. At this time, the direction in which the electromagnetic force according to the direction of the current applied to the first-first coil 322C1 and the first-second coil 322C2 is applied may be a positive y-axis direction (upward direction) and a negative y-axis direction (downward direction).

Accordingly, the prism unit 330 may be tilted vertically with respect to the first line L1 as a reference axis. That is, the prism unit 330 may be tilted at a predetermined angle in the vertical direction based on the first line L1. Accordingly, a movement path of the light incident on the prism unit 330 may be controlled.

Referring to FIG. 10a, the prism unit 330 may be provided to be able to rotate in a second direction with respect to the imaginary second line L2 on which the ball bearing 350 is formed as a reference axis. In detail, the driving unit 320 may rotate the prism unit 330 in a left and right direction.

To this end, the prism unit 330 may receive a driving force through the second driving unit 323.

For example, a repulsive force may be generated between the second-first coil 323C1 and the second-first magnet 323M1 of the second driving unit 323. Also, an attractive force may be generated between the second-second coil 323C2 and the second-second magnet 323M2 of the second driving unit 323.

Also, on the contrary, an attractive force may be generated between the second-first coil 323C1 and the second-first magnet 323M1 of the second driving unit 323. In addition, a repulsive force may be generated between the second-second coil 323C2 and the second-second magnet 323M2 of the second driving unit 323.

Accordingly, the prism unit 330 may be tilted in the left and right directions with respect to the second line L2 as a reference axis. That is, the prism unit 330 may be tilted at a predetermined angle in the left and right directions based on the second line L2. Accordingly, a movement path of the light incident on the prism unit 330 may be controlled.

Hereinafter, a second actuator according to a second embodiment will be described. Here, the second actuator may be a prism driving device as described above.

Second Embodiment

FIG. 11 is a perspective view of a second camera actuator according to the second embodiment, FIG. 12 is an exploded perspective view of a second camera actuator according to the second embodiment, FIG. 13 is a cross-sectional view in a yz plane of the second camera actuator according to the second embodiment, FIG. 14 is a cross-sectional view in a x-z plane of the second camera actuator according to the second embodiment, FIG. 15 is a perspective view of a partial configuration of a second camera actuator according to the second embodiment, and FIGS. 16 and 17 are operation diagrams of a second camera actuator according to the second embodiment.

Referring to FIGS. 11 to 17, the second camera actuator 1000B according to an embodiment of the present invention may be included a housing 1100, a guide portion 1200, a prism mover 1300, a prism 1400, a first driving unit 1500, a driving unit circuit board 1600, and a second driving unit 1700, but may be implemented except for some of these configurations, and additional configurations are not excluded. The prism mover 1300 and the prism 1400 may constitute a prism unit as in the first embodiment. In addition, the first driving unit 1500, the driving unit circuit board 1600, and the second driving unit 1700 may constitute the driving unit.

The second camera actuator 1000B may include a housing 1100. The housing 1100 may form the exterior of the second camera actuator 1000B. The housing 1100 may be formed in a hexahedral shape with an open top and side surfaces. The guide portion 1200, the prism mover 1300, the prism 1400, the first driving unit 1500, the driving unit circuit board 1600, and the second driving unit 1700 may be disposed in the housing 1100.

The housing 1100 may include a lower surface 1110, a first sidewall 1130, a second sidewall 1140 facing the first sidewall 1130, a third sidewall 1120 facing the first sidewall 1130 and the second sidewall 1140. The driving unit circuit board 1600 may be disposed on the lower surface 1110 of the housing 1100. The guide portion 1200 may be coupled to the third sidewall 1120 of the housing 1100. The third sidewall 1120 of the housing 1100 may include a plurality of grooves 1122. The plurality of grooves 1122 may include a first groove and a second groove spaced apart from the first groove in the first direction. Here, the first direction may be interpreted as meaning an x-axis direction. The first groove and the second groove of the third sidewall 1120 may be formed in a 'v' shape. One end of the guide portion 1200 may be coupled to the first groove of the third sidewall 1120, and the other end of the guide portion 1200 may be coupled to the second groove. The third sidewall 1120 may be spaced apart from at least a part of the guide portion 1200.

The second camera actuator 1000B may include the guide portion 1200. The guide portion 1200 may be disposed in the housing 1100. The guide portion 1200 may be coupled to the housing 1100. The guide portion 1200 may be coupled to the third sidewall 1120 of the housing 1100. One end of the guide portion 1200 may be coupled to the first groove of the third sidewall 1120 of the housing 1100, and the other end may be coupled to the second groove of the third sidewall 1120 of the housing 1100. In this case, an adhesive member is disposed between one end of the Guide portion 1200 and the first groove of the third sidewall 1120 of the housing 1100, and accordingly, one end of the Guide portion 1200 may be fixed to the first groove of the third side wall 1120 of the housing 1100, In addition, an adhesive member is disposed between the other end of the Guide portion 1200 and the second groove of the third sidewall 1120 of the housing 1100, and accordingly, the other end of the Guide portion 1200 may be fixed to the second groove of the third side wall 1120 of the housing 1100.

The guide portion 1200 may be formed in a partial shape of a ring. Specifically, the guide portion 1200 may be formed in the shape of a ring cut in part. The guide portion 1200 may be formed in an arc shape. A cross-section of the guide portion 1200 may be formed in an arc shape. A cross-section of the guide portion 1200 may be formed in a circular shape. At least a part of the guide portion 1200 may be spaced apart from the housing 1100. The central region of the guide portion 1200 may be farthest apart from the third sidewall 1120 of the housing 1100. The guide portion 1200 may be closer to the housing 1100 from the central region toward one side or the other side. Specifically, the guide portion 1200 may be closer to the third sidewall 1120 of the housing 1100 from the central region toward one side or the other side.

The guide portion 1200 may be disposed at a higher position than the first driving unit 1500 and the second driving unit 1700. At least a part of the guide portion 1200 may overlap the second driving unit 1700 in the second direction. Specifically, the central region of the guide portion 1200 may overlap the second-third driving unit 730 in the second direction. In an embodiment of the present invention, the second direction may mean a y-axis direction.

The guide portion 1200 may be connected to the prism mover 1300. Specifically, at least a part of the guide portion 1200 may pass through a hole 1312 of a fastening portion 1310 of the prism mover 1300. In this case, a radius of the cross section of the guide portion 1200 may be smaller than a radius of the hole 1312 of the fastening portion 1310 of the prism mover 1300. Through this, the guide portion 1200 may guide the tilting of the prism mover 1300 in the biaxial direction. A linear distance between one side and the other side of the guide portion 1200 may be shorter than a length in the first direction of the prism mover 1300.

The guide portion 1200 may be formed of a non-magnetic material. For example, the guide portion 1200 may be formed of a stainless (SUS) material. Through this, electromagnetic interference to the first driving unit 1500 and the second driving unit 1700 may be prevented.

The second camera actuator 1000E may include a prism mover 1300. The prism mover 1300 may be disposed in the housing 1100. The prism mover 1300 may be disposed inside the housing 1100. The prism mover 1300 may be coupled to the guide portion 1200 to be tiltably disposed in the housing 1100. The prism mover 1300 may include a receiving portion in which the prism 1400 is disposed.

The prism mover 1300 may include a first side surface and a second side surface. The first side of the prism mover 1300 may face the first sidewall 1130 of the housing 1100. A first magnet 1510 may be disposed on the first side surface of the prism mover 1300. The second side surface of the prism mover 1300 may face the second sidewall 1140 of the housing 200. A second magnet 1520 may be disposed on the second side surface of the prism mover 1300. A normal line of the first side surface may be parallel to a normal line of the second side surface. The normal line of the first side surface or the normal line of the second side surface may be orthogonal to a normal line of the inclined surface of the prism mover 1300.

The prism mover 1300 may include a fastening portion 1310. The fastening portion 1310 may be formed on an inclined surface facing the third sidewall 1120 of the housing 1100. The fastening portion 1310 may be formed to protrude toward the third sidewall 1120 from an inclined surface facing the third sidewall 1120 of the housing 1100. The length of the fastening portion 1310 in the first direction may be greater than a difference between the radius of the hole 1312 of the fastening portion 1310 and the radius of the cross-section of the guide portion 1200. A third magnet 520 may be disposed on an inclined surface of the prism mover 1300. A seating portion 1320 may be formed on an inclined surface of the prism mover 1300, and a third magnet 1520 may be disposed on the seating portion 1320.

A guide portion 1200 may be disposed on the fastening portion 1310. The fastening portion 1310 may include a hole 1312. The hole 1312 may be formed to extend in the second direction. The hole 1312 may be penetrated by the guide portion 1200. A radius of the hole 1312 may be larger than a radius of a cross-section of the guide portion 1200. Through this, the prism mover 1300 may be tiltably disposed inside the housing 1100. In addition, through the shape of the guide portion 1200 described above, the prism mover 1300 may be tilted based on the x-axis and tilted based on the y-axis.

The prism mover 1300 may be tilted by a predetermined interval in the first direction with respect to the center of the guide portion 1200. The prism mover 1300 may be tilted in the first direction by the first magnet 1510 and the second magnet 1520. The prism mover 1300 may be tilted in a third direction perpendicular to the first direction by the third magnet 1530.

The second camera actuator 1000E may include a prism 1400. The prism 1400 may be disposed inside the housing 1100. The prism 1400 may be disposed on the prism mover 1300. A top surface and a side surface of the prism 1400 may be exposed to the outside. The prism 1400 may vertically change a movement path of the light by reflecting light propagating from the upper portion. The prism 1400 is coupled to the prism mover 1300 and may be tilted based on the x-axis or tilted based on the y-axis according to the movement of the prism mover 1300.

The second camera actuator 1000B may include a first driving unit 1500. The first driving unit 1500 may be disposed on the prism mover 1300. The first driving unit 1500 may include a magnet. The first driving unit 1500 may face the second driving unit 1700. The first driving unit 1500 may tilt the prism mover 1300 through electromagnetic interaction with the second driving unit 1700.

The first driving unit 1500 may include a first-first driving unit 1510 disposed on a surface opposite to the first sidewall 1130 and/or the first surface 1710 among the outer surfaces of the prism mover 1300; a first-second driving unit 1520 disposed on a surface opposite to the second sidewall 1140 and/or the second surface 1720 of the outer surface of the prism mover 1300; and a first-third driving unit 1530 disposed on a surface 1320 opposite to the third sidewall 1120 and/or the third surface 1730 among the outer surfaces of the prism mover 1300. The first-first to first-third driving units 1510, 1520, and 1530 may face the second-first to second-third driving units 1710, 1720, and 1730, respectively. The prism 1400 and the prism mover 1300 by electromagnetic interaction of the first-first and first-second driving units 1510 and 1520 and the second-first and second-second driving units 1710 and 1720 may be tilted based on the y-axis. Due to the electromagnetic interaction between the first-third driving unit 1530 and the second-third driving unit 1730, the prism 1400 and the prism mover 1300 may be tilted based on the x-axis. Meanwhile, the driving unit in the second embodiment was grouped separately for each coil and magnet differently from the first embodiment. However, the present invention is not limited thereto, and as in the first embodiment, the coils and magnets facing each other may be grouped into one driving unit group and named.

The first-first driving unit 1510 may be a first magnet 1510. The first-second driving unit 1520 may be a second magnet 1520. The first-third driving unit 1530 may be a third magnet 1530.

The second camera actuator 1000B may include a yoke (not shown). The yoke may be disposed between the first driving unit 1500 and the prism mover 1300. The yoke may surround at least a part of the surfaces of the first driving unit 1500 except for the surface facing the second driving unit 1700 to prevent leakage of the magnetic field.

The second camera actuator 1000B may include a driving unit circuit board 1600. The driving unit circuit board 1600 may be disposed in the housing 1100. A lower surface of the driving unit circuit board 1600 may be disposed on the lower surface 1100 of the housing 1100. A second driving unit 1700 may be disposed on the driving unit circuit board 1600. The driving unit circuit board 1600 may receive power from the outside and supply current to the second driving unit 1700.

At least a part of the substrate may be bent. The driving unit circuit board 1600 may include first to third surfaces 1610, 1620, and 1630. The first to third surfaces 1610, 1620, and 1630 of the driving unit circuit board 1600 may face the first to third sidewalls 1130, 1140, and 1120 of the housing 1100, respectively.

The driving unit circuit board 1600 may include a printed circuit board (PCB). The driving unit circuit board 1600 may include a flexible printed circuit board (FPCB).

The second camera actuator 1000B may include a second driving unit 1700. The second driving unit 1700 may be disposed in the housing 1100. The second driving unit 1700 may be disposed inside the housing 1100. The second driving unit 1700 may be disposed on the driving unit circuit board 1600. The second driving unit 1700 may be electrically connected to the driving unit circuit board 1600. The second driving unit 1700 may include a coil. The second driving unit 1700 may face the first driving unit 1500. The second driving unit 1700 may tilt the prism 1400 and the prism mover 1300 through electromagnetic interaction with the first driving unit 1500.

The second driving unit 1700 may include a second-first driving unit 1710 disposed on the first surface 1610 of the driving unit circuit board 1600, a second-second driving unit 1720 disposed on the second surface 1620 of the driving unit circuit board 1600, and a second-third driving unit 1730 disposed on the third surface 1630 of the driving unit circuit board 1600. The second-first to second-third driving units 1710, 1720, and 1730 may face the first-first to first-third driving units 1510, 1520, and 1530, respectively. The prism 1400 and the prism mover 1300 are may be tilted based on the y-axis by electromagnetic interaction between the second-first and second-second driving units 1710 and 1720 and the first-first and first-second driving units 1510 and 1520. The prism 1400 and the prism mover 1300 may be tilted based on the x-axis by electromagnetic interaction between the second-third driving unit 1730 and the first-third driving unit 1530.

The second-first driving unit 1710, the second-second driving unit 1720, and the second-third driving unit 1730 may be a first coil, a second coil, and a third coil, respectively.

The second camera actuator 10003 may include a sensor (not shown). The sensor may be disposed in the second driving unit 1700. The sensor may face the first driving unit 1500. The sensor may include a Hall sensor. The sensor may detect the movement of the first driving unit 1500. Through this, feedback control is possible.

The second camera actuator 1000B may include a cover member 1800. The cover member 1800 may surround the housing 1100. The cover member 1800 may be formed of a metal material. The cover member 1800 may prevent the electromagnetic field generated inside the second camera actuator 1000B from being emitted to the outside. The cover member 1800 may prevent electromagnetic interference within the second camera actuator 1000E that may be generated from the outside.

According to this second embodiment, the tilting of the prism 1300 with respect to the x-axis and the tilting of the prism 300 with respect to the y-axis are possible through the structure of the simple guide portion 1200, so that the product size can be reduced. Here, the tilting angle of the prism 1300 with respect to the x-axis may be within 1.5 degrees, and the tilting angle of the prism 1300 with respect to the y-axis may be within 1.5 degrees.

<First Camera Actuator 100>

Hereinafter, a first camera actuator 100 will be described.

FIG. 18 is a perspective view of a first camera actuator 100 according to an embodiment, FIG. 19 is a perspective view in which a part of a configuration of the camera actuator according to the embodiment shown in FIG. 18 is omitted, and FIG. 20 is an exploded perspective view in which a part of the configuration of the camera actuator according to the embodiment shown in FIG. 18 is omitted.

Referring to FIG. 18, the first camera actuator 100 according to the embodiment may include a base 20, a circuit board 410 disposed outside the base 20, a fourth driving unit 142, and a third lens assembly 130.

FIG. 19 is a perspective view in which the base 20 and the circuit board 410 are omitted in FIG. 18, and referring to FIG. 19, a first camera actuator 100 according to an embodiment includes a first guide portion 210, a second guide portion 220, a first lens assembly 110, a second lens assembly 120, a third driving unit 141, and a fourth driving unit 142.

The third driving unit 141 and the fourth driving unit 142 may include a coil or a magnet.

For example, when the third driving unit 141 and the fourth driving unit 142 include the coil, the third driving unit 141 may include a first coil part 141*b* and a first yoke 141*a*, and the fourth driving unit 142 may include a second coil part 142*b* and a second yoke 142*a*.

Or, conversely, the third driving unit 141 and the fourth driving unit 142 may include the magnet.

In an xyz-axis direction shown in FIG. 20, a z-axis may refer to an optic axis direction or a direction parallel thereto, an xz plane represents the ground, and an x-axis may refer to a direction perpendicular to the z-axis on the ground (xz plane, and a y-axis may refer to a direction perpendicular to the ground.

Referring to FIG. 20, a first camera actuator 100 according to an embodiment may include a base 20, a first guide portion 210, a second guide portion 220, a first lens assembly 110, a second lens assembly 120, and a third lens assembly 130.

For example, the first camera actuator 100 according to the embodiment may include the base 20, the first guide portion 210 disposed on one side of the base 20, the second guide portion 220 disposed on the other side of the base 20, the first lens assembly 110 corresponding to the first guide portion 210, the second lens assembly 120 corresponding to the second guide portion 220, a first ball bearing 117 (see FIG. 15A) disposed between the first lens assembly 110 and the first guide portion 210, and a second ball bearing (not shown) disposed between the second guide portion 220 and the second lens assembly 120.

In addition, the embodiment may include the third lens assembly 130 disposed in front of the first lens assembly 110 in the optic axis direction.

<Guide Portion>

Referring to FIG. 19 and FIG. 20, the embodiment may include a first guide portion 210 disposed adjacent to the first side wall 21*a* of the base 20, and a second guide portion 220 disposed adjacent to the second side wall 21*b* of the base 20.

The first guide portion 210 may be disposed between the first lens assembly 110 and the first side wall 21*a* of the base 20.

The second guide portion 220 may be disposed between the second lens assembly 120 and the second side wall 21*b* of the base 20. The first side wall 21*a* and the second side wall 21*b* of the base may be disposed to face each other.

According to the embodiment, a lens assembly is driven in a state in which the first guide portion 210 and the second guide portion 220, which are precisely numerically controlled in the base, are coupled to each other, so that friction resistance is reduced by reducing friction torque, and thus there are technical effects such as improvement of driving force, reduction of power consumption, and improvement of control characteristics during zooming.

Accordingly, according to the embodiment, there is a complex technical effect that image quality or resolution may be improved remarkably by preventing occurrence of a phenomenon that a decenter of a lens, tilt of the lens, and a central axis of a lens group and an image sensor are not aligned while minimizing the friction torque during zooming.

In the related art, when guide rails are disposed in the base itself, a gradient is generated along an injection direction, and thus there is difficulty in dimensional control, and there was a technical problem that friction torque increases and driving force decreases when injection is not performed normally.

On the other hand, according to the embodiment, the first guide portion 210 and the second guide portion 220 which are formed separately from the base 20 are applied separately without disposing the guide rails on the base itself, and thus there is a special technical effect that generation of a gradient along the injection direction may be prevented.

The base 20 may be injected in a Z-axis direction. In the related art, when a rail is integrally formed with the base, there is a problem that a straight line of the rail is distorted due to a gradient generated while the rail is injected in the Z-axis direction.

According to the embodiment, since the first guide portion 210 and the second guide portion 220 are injected separately from the base 20, it is possible to prevent generation of a gradient remarkably as compared with the related art, and thus there is a special technical effect that precise injection may be performed and generation of a gradient due to injection may be prevented.

In the embodiment, the first guide portion 210 and the second guide portion 220 may be injected on an X-axis, and a length injected may be shorter than the base 20. In this case, when rails 212 and 222 are disposed on the first guide portion 210 and the second guide portion 220, generation of a gradient during injection may be minimized, and there is a technical effect that possibility that the straight line of the rail is distorted is low.

FIG. 21 is an enlarged perspective view of a first guide portion 210 and a second guide portion 220 of a camera actuator according to an embodiment.

Referring to FIG. 21, in the embodiment, the first guide portion 210 may include a single or a plurality of first rails 212. In addition, the second guide portion 220 may include a single or a plurality of second rails 222.

For example, the first rail 212 of the first guide portion 210 may include a first-first rail 212*a* and a first-second rail 212b. The first guide portion 210 may include a first support portion 213 between the first-first rail 212a and the first-second rail 212b.

According to the embodiment, two rails for each lens assembly are provided, and thus there is a technical effect that even though any one of the rails is distorted, the accuracy may be secured by the other one.

In addition, according to the embodiment, the two rails for each lens assembly are provided, and thus there is a technical effect that despite an issue of the frictional force of the ball described later at any one of the rails, the driving force may be secured as the cloud driving proceeds smoothly in the other one.

The first rail 212 may be connected from one surface of the first guide portion 210 to the other surface thereof.

A camera actuator according to the embodiment and a camera module including the same solve a problem of lens decenter or tilt generation during zooming, and align a plurality of lens groups well to prevent a change in an angle of view or occurrence of defocusing, and thus there is a technical effect that image quality or resolution is significantly improved.

For example, according to the embodiment, the first guide portion 210 includes the first-first rail 212a and the first-second rail 212a, and the first-first rail 212a and the first-second rail 212a guide the first lens assembly 110, and thus there is a technical effect that accuracy of alignment may be improved.

In addition, according to the embodiment, since the two rails for each lens assembly are provided, it is possible to secure widely a distance between balls described later, and accordingly, there is a technical effect that a driving force may be improved, interference of a magnetic field may be prevented, and tilt may be prevented when the lens assembly is stopped or moved.

In addition, the first guide portion 210 may include a first guide protruding portion 215 that extends in a side surface direction perpendicular to a direction in which the first rail 212 extends.

A first protrusion 214p may be included on the first guide protruding portion 215. For example, the first protrusion 214p may include a first-first protrusion 214p1 and a first-second protrusion 214p2.

Referring to FIG. 21, in the embodiment, the second guide portion 220 may include a single or a plurality of second rails 222.

For example, the second rail 222 of the second guide portion 220 may include a second-first rail 222a and a second-second rail 222b. The second guide portion 220 may include a second support portion 223 between the second-first rail 222a and the second-second rail 222b.

The second rail 222 may be connected from one surface of the second guide portion 210 to the other surface thereof.

In addition, the second guide portion 220 may include a second guide protruding portion 225 that extends in a side surface direction perpendicular to a direction in which the second rail 222 extends.

A second protrusion 224p including a second-first protrusion 224p1 and a second-second protrusion 224p2 may be included on the second guide protruding portion 225.

The first-first protrusion 214p1 and first-second protrusion 214p2 of the first guide portion 210 and the second-first protrusion 224p1 and second-second protrusion 224p2 of the second guide portion 220 may be coupled to a third housing 21 of a third lens assembly 130 described later.

According to the embodiment, the first guide portion 210 includes the first-first rail 212a and the first-second rail 212b, and the first-first rail 212a and the first-second rail 212b guide the first lens assembly 110, and thus there is a technical effect that accuracy of alignment may be improved.

In addition, according to the embodiment, the second guide portion 220 includes the second-first rail 222a and the second-second rail 222b, and the second-first rail 222a and the second-second rail 222b guide the second lens assembly 120, and thus there is a technical effect that alignment accuracy may be increased.

Further, two rails for each lens assembly are provided, and thus there is a technical effect that even though any one of the rails is distorted, the accuracy may be secured by the other one.

In addition, according to the embodiment, since the two rails for each lens assembly are provided, it is possible to secure widely a distance between balls described later, and accordingly, there is a technical effect that a driving force may be improved, interference of a magnetic field may be prevented, and tilt may be prevented when the lens assembly is stopped or moved.

Further, according to the embodiment, the two rails for each lens assembly are provided, and thus there is a technical effect that despite an issue of the frictional force of the ball described later at any one of the rails, the driving force may be secured as the cloud driving proceeds smoothly in the other one.

Furthermore, according to the embodiment, the first guide portion 210 and the second guide portion 220 which are formed separately from the base 20 are applied separately without disposing the guide rails on the base itself, and thus there is a special technical effect that generation of a gradient along the injection direction may be prevented.

In the related art, when guide rails are disposed in the base itself, a gradient is generated along an injection direction, and thus there is difficulty in dimensional control, and there was a technical problem that friction torque increases and driving force decreases when injection is not performed normally.

Next, FIG. 22A is a perspective view of a first lens assembly 110 of the camera actuator according to the embodiment shown in FIG. 20, and FIG. 22B is a perspective view in which a part of a configuration of the first lens assembly 110 shown in FIG. 22A is removed.

Referring briefly to FIG. 20, the embodiment may include a first lens assembly 110 moving along the first guide portion 210 and a second lens assembly 120 moving along the second guide portion 220.

Referring again to FIG. 22A, the first lens assembly 110 may include a first lens barrel 112a on which a first lens 113 is disposed and a first driving unit housing 112b on which a first driving unit 116 is disposed. The first lens barrel 112a and the first driving unit housing 112b may be a first housing, and the first housing may be in a barrel shape or a lens-barrel shape. The first driving unit 116 may be a magnet driving portion, but the embodiment is not limited thereto, and in some cases, a coil may be disposed therein.

In addition, the second lens assembly 120 may include a second lens barrel (not shown) on which a second lens (not shown) is disposed and a second driving unit housing (not shown) on which a second driving unit (not shown) is disposed. The second lens barrel (not shown) and the second driving unit housing (not shown) may be a second housing, and the second housing may be in a barrel shape or a lens-barrel shape. The second driving unit may be a magnet driving portion, but the embodiment is not limited thereto, and in some cases, a coil may be disposed therein.

The first driving unit 116 may correspond to the two first rails 212, and the second driving unit may correspond to the two second rails 222.

In the embodiment, it is possible to drive using a single or a plurality of balls. For example, the embodiment may include a first ball bearing 117 disposed between the first guide portion 210 and the first lens assembly 110 and a second ball bearing (not shown) disposed between the second guide portion 220 and the second lens assembly 120.

For example, in the embodiment, the first ball bearing 117 may include a single or a plurality of first-first ball bearings 117a disposed above the first driving unit housing 112b and a single or a plurality of first-second ball bearings 117b below the first driving unit housing 112b.

In the embodiment, the first-first ball bearing 117a of the first ball bearing 117 may move along a first-first rail 212a which is one of the first rails 212, and the first-second ball bearing 117b of the first ball bearings 117 may move along a first-second rail 212b which is another one of the first rails 212.

A camera actuator according to the embodiment and a camera module including the same solve a problem of lens decenter or tilt generation during zooming, and align a plurality of lens groups well to prevent a change in an angle of view or occurrence of defocusing, and thus there is a technical effect that image quality or resolution is significantly improved.

For example, according to the embodiment, the first guide portion includes the first-first rail and the first-second rail, and the first-first rail and the first-second rail guide the first lens assembly 110, and thus there is a technical effect that accuracy of alignment between the second lens assembly 110 and an optic axis may be improved when the first lens assembly 110 moves.

Referring also to FIG. 22B, in an embodiment, the first lens assembly 110 may include a first assembly groove 112b1 on which the first ball bearing 117 is disposed. The second lens assembly 120 may include a second assembly groove (not shown) on which the second ball bearing is disposed.

The first assembly groove 112b1 of the first lens assembly 110 may be in plural. In this case, a distance between two first assembly grooves 112b1 of the plurality of first assembly grooves 112b1 with respect to an optic axis direction may be longer than a thickness of the first lens barrel 112a.

In the embodiment, the first assembly groove 112b1 of the first lens assembly 110 may be in a V-shape. Further, the second assembly groove (not shown) of the second lens assembly 120 may be in a V-shape. The first assembly groove 112b1 of the first lens assembly 110 may be in a U-shape in addition to the V-shape, or a shape that contacts the first ball bearing 117 at two or three points. In addition, the second assembly groove (not shown) of the second lens assembly 120 may be in a U-shape in addition to the V-shape, or a shape that contacts the first ball bearing 117 at two or three points.

Next, FIG. 23 is a driving example view of the camera actuator according to the embodiment.

An interaction in which an electromagnetic force DEM is generated between a first magnet 116 and a first coil part 141b in the camera module according to the embodiment will be described with reference to FIG. 23.

As shown in FIG. 23, a magnetization method of the first magnet 116 of the camera module according to the embodiment may be a vertical magnetization method. For example, in the embodiment, all of an N-pole 116N and an S-pole 116S of the first magnet 116 may be magnetized so as to face the first coil part 141b. Accordingly, the N-pole 116N and the S-pole 116S of the first magnet 116 may be respectively disposed so as to correspond to a region in which current flows in a y-axis direction perpendicular to the ground at the first coil part 141b.

Referring to FIG. 23, in the embodiment, a magnetic force DM is applied in a direction opposite to an x-axis at the N-pole 116N of the first magnet 116, and when a current DE flows in a y-axis direction in a region of the first coil part 141b corresponding to the N-pole 116N, the electromagnetic force DEM acts in a z-axis direction with respect to the Fleming's left-hand rule.

In addition, in the embodiment, the magnetic force DM is applied in the x-axis direction at the S-pole 116S of the first magnet 116, and when the current DE flows in a direction opposite to the y-axis perpendicular to the ground at the first coil part 141b corresponding to the S pole 116S, the electromagnetic force DEM acts in a z-axis direction with respect to the Fleming's left-hand rule.

At this time, since a third driving unit 141 including the first coil part 141b is in a fixed state, the first lens assembly 110, which is a mover on which the first magnet 116 is disposed, may be moved back and forth along a rail of the first guide portion 210 in a direction parallel to the z-axis direction by the electromagnetic force DEM according to a current direction. The electromagnetic force DEM may be controlled in proportion to the current DE applied to the first coil part 141b.

Likewise, an electromagnetic force DEM is generated between a second magnet (not shown) and the second coil part 142b of the camera module according to the embodiment, and thus the second lens assembly 120 may be moved along a rail of the second guide portion 220 horizontally with respect to the optic axis.

As described above, when implementing AF or Zoom in the related art, a plurality of lens assemblies are driven by the electromagnetic force between a magnet and a coil, and in order to obtain the position information of the lens assembly, a hall sensor is disposed inside the winding of the coil. The inside of the winding of the coil in which the hall sensor is disposed may be hollow. The hall sensor may obtain the position information of the lens assembly by sensing a change in magnetic flux of the magnet disposed in the lens assembly. However, when the hall sensor is positioned inside the con, a distance between the hall sensor and the magnet is determined by a height of the coil.

However, in the related art, thrust is required for the movement of the lens assembly, and in order to secure such thrust, the height of the coil is required to be higher than a predetermined height.

However, when the height of the coil is increased as described above, the distance between the hall sensor and the magnet is increased by the heightened coil. Accordingly, since the magnetic flux of the magnet is blocked, there is a technical contradiction in which the sensitivity of the magnetic flux sensed by the hall sensor disposed inside the coil is lowered. On the contrary, when the height of the coil is reduced, the electromagnetic force between the magnet and the coil is weakened, and the thrust for AF or Zoom driving is deteriorated.

According to the applicant's private internal technology, in order to solve such problems, the optimum point of the sensitivity of the hall sensor and thrust is set by a coil having an appropriate height. In addition, the deteriorated thrust or weakened sensitivity of the hall sensor causes problems in the precision of all camera controls, and a decent or tilt phenomena of the camera module is induced, and thus it may be directly related to the safety or life of a driver who is a user or pedestrian.

One of technical problems of the embodiment is to provide a camera actuator capable of improving simultaneously the sensitivity of the hall sensor while increasing the thrust, and a camera module including the same.

FIG. 24 is a cross-sectional view taken along line C1-C2 in the camera actuator according to the embodiment shown in FIG. 18.

Referring to FIG. 24, the first camera actuator 100 according to the embodiment may include a base 20 and a lens assembly disposed in the base 20. For example, a third lens assembly 130, a first lens assembly 110, and a second lens assembly 120 may be sequentially disposed in the base 20 based on a light incident direction, and an image sensor 180 may be disposed on a rear side of the second lens assembly 120.

As described above, the first camera actuator 100 according to the embodiment may be driven by an electromagnetic force of a predetermined magnet and coil part.

For example, referring to FIG. 24, in the camera actuator according to the embodiment, the first lens assembly 110 may include a first driving unit 116 and a third driving unit 141, and the second lens assembly 120 may include a second driving unit 126 and a fourth driving unit 142.

The first driving unit 116 and the second driving unit 126 may be magnet driving portions, and the third driving unit 141 and the fourth driving unit 142 may be coil driving portions, but the embodiment is not limited thereto.

Hereinafter, it will be described as a case in which the first driving unit 116 and the second driving unit 126 are magnet driving portions, respectively, and the third driving unit 141 and the fourth driving unit 142 are coil driving portions, respectively.

In the camera module according to the embodiment, in the first lens assembly 110, the first driving unit 116 may include a first magnet 116b and a first yoke 116a, and the third driving unit 141 may include a first coil part 141b and a third yoke 141a. The third driving unit 141 may include a first circuit board 41 between the first coil part 141b and the third yoke 141a.

In addition, the embodiment may include a first spacer 141c disposed in the base 20 and a first position detection sensor 71 disposed on the first spacer 141c. The first spacer 141c may be formed of any one or more of polycarbonate (PC), polyethylene terephthalate glycol (PETG), polyethylene (PE) and polypropylene (PP), but the embodiment is not limited thereto.

The first position detection sensor 71 may be a magnetic sensor. For example, the first position detection sensor 71 may be any one of a solid magnetic sensor such as a hall sensor, a coiled magnetic sensor, a resonance magnetic sensor, and the like, but the embodiment is not limited thereto.

In addition, in the camera module according to the embodiment, in the second lens assembly 120, the second driving unit 126 may include a second magnet 126b and a second yoke 126a, and the fourth driving unit 142 may include a second coil part 142b and a fourth yoke 142a. The fourth driving unit 142 may include a second circuit board 42 between the second coil part 142b and the fourth yoke 142a.

In addition, the embodiment may include a second spacer 142c disposed in the base 20 and a second position detection sensor 72 disposed on the second spacer 142c. The second spacer 142c may be formed of any one or more of polycarbonate (PC), polyethylene terephthalate glycol (PETG), polyethylene (PE) and polypropylene (PP), but the embodiment is not limited thereto.

The second position detection sensor 72 may be any one magnetic sensor of a coiled magnetic sensor, a solid magnetic sensor such as a hall sensor, a resonance magnetic sensor, and the like, but the embodiment is not limited thereto.

Hereinafter, technical features of a disposition structure of a position sensor in the embodiment will be described with reference to FIGS. 24 and 25A to 25C.

FIG. 25A is an enlarged view of the S region shown in FIG. 24, and FIG. 25B is a detailed view of the S region shown in FIG. 24A.

First, referring to FIGS. 24 and 25A, the embodiment may include a base 20, a first lens assembly 110 disposed in the base 20, the third driving unit 141 which is a coil driving unit disposed in the base 20, a first spacer 141c disposed in the base 20, and a first position detection sensor 71 disposed on the first spacer 141c.

The third driving unit 141 may include a first circuit board 41a disposed between the first coil part 141b and the third yoke 141a.

The first coil part 141b and the first position detection sensor 71 may be electrically connected to the first circuit board 41a.

Next, referring to FIG. 25B, the first spacer 141c may include a first support portion 141c1 and a first protruding portion 141c3 protruding from the first support portion 141c1, the first position detection sensor 71 may be disposed on the first protruding portion 141c3, and the first protruding portion 141c3 may be disposed in the hollow of the first coil part 141b which is the coil driving portion.

In this case, the embodiment may include a first connecting portion 141c2 connecting the first protruding portion 141c3 and the first support portion 141c1.

Referring to FIG. 25B, the first circuit board 41a may include a first substrate region 41a1 disposed on the first spacer 141c and a second substrate region 41a3 disposed to be spaced apart from the first substrate region 41a1. The first circuit board 41a may include a second-second substrate region 41a2 connecting the first substrate region 41a1 and the second substrate region 41a3. The first position detection sensor 71 may be disposed on the second substrate region 41a3, and the second substrate region 41a3 may be disposed in the hollow of the first coil part 141b which is the coil driving portion.

In addition, referring to FIG. 24, the embodiment may include the base 20, a second lens assembly 120 disposed in the base 20, the fourth driving unit 142 which is a coil driving unit disposed in the base 20, the second spacer 142c disposed in the base 20, and the second position detection sensor 72 disposed on the second spacer 142c.

In addition, the second spacer 142c may also adopt technical features of the first spacer 141c. For example, referring to FIG. 17, the second spacer 142c may include a second protruding portion (not shown) protruding from a second support portion (not shown), the second position detection sensor 72 may be disposed on the second protruding portion, and the second protruding portion may be disposed in the hollow of the fourth driving unit 142 which is the coil driving portion.

The second protruding portion may include a second seating portion (not shown), and the second position detection sensor 72 may be disposed on the second seating portion.

In addition, referring to FIG. 24, the second circuit board 41*b* may include a third substrate region (not shown) disposed on the second spacer 142*c* and a fourth substrate region disposed to be spaced apart from the third substrate region. The second circuit board 41*b* may include a fourth-second substrate region connecting the third substrate region and the fourth substrate region.

The second position detection sensor 72 may be disposed on the fourth-second substrate region, and the fourth-second substrate region may be disposed in the hollow of the fourth driving unit 142 which is the coil driving portion.

Again, Referring to FIG. 25B, the first lens assembly 110 may be driven in the optical axis direction by the electromagnetic force (DEM) between the first magnet 116*b* of the first driving unit 116 and the first coil part 141*b* of the third driving unit 141.

At this time, the electromagnetic force (DEM) is affected by a distance (DCM) between the first magnet 116*b* and the first coil part 141*b*.

The magnetic flux of the magnet sensed by the hall sensor is changed according to a separation distance between the hall sensor and the magnet, and thus the performance of position detection of the hall sensor is affected.

For example, FIG. 25C is magnetic flux data according to the separation distance between the magnet and the first position detection sensor 71 in Example and Comparative Example.

In the conventional internal technology, the height of the coil part should be ensured to secure thrust. In the related art, as the height of the coil part increases according to disposing the hall sensor on the PCB under the coil part, the separation distance between the magnet and the hall sensor increases, and thus there was a technical limitation that a first distance DH1 spaced apart between the magnet and the hall sensor should be secured at least 800 μm or more.

Accordingly, in the conventional internal technology (Comparative Example), the magnetic flux detected by the hall sensor was a level of securing about 50 mT.

In addition, in the conventional internal technology, when the height of the coil increases, the magnetic flux of the magnet, which may be introduced into the hall sensor disposed in the hollow portion of the coil, is partially blocked, so that the sensitivity of the hall sensor is lowered. On the other hand, according to the embodiment, the first spacer 141*c* includes a first protruding portion 141*c*3 protruding from the first support portion 141*c*1, and the first position detection sensor 71 is disposed on the first protruding portion 141*c*3, and accordingly, a second distance DH2 between the first magnet 116*b* and the first position detection sensor 71 is significantly reduced, and thus there is a technical effect that the magnetic flux of the first magnet 116*b* sensed by the first position detection sensor 71 is significantly improved.

For example, according to the embodiment, as the first position detection sensor 71 is disposed on the first protruding portion 141*c*3, it is possible to secure the second distance DH2 between the first magnet 116*b* and the first position detection sensor 71 to 400 μm or less, which is more than two times shorter than that of Comparative Example, and accordingly, there is a unique technical effect that the magnetic flux between the first magnet 116*b* and the first position detection sensor 71 may be secured up to about 150 mT, which is about three times higher than that of Comparative Example.

In addition, according to the embodiment, as the first position detection sensor 71 is disposed on the first protruding portion 141*c*3, the first position detection sensor 71 is almost exposed to the first magnet 116*b* even though it is disposed in the hollow of the first coil part 141*b*, and thus there is a special technical effect that blocking of magnetic flux by the first coil part 141*b* is significantly reduced.

Accordingly, the camera actuator according to the embodiment and the camera module including the same have a unique technical effect of simultaneously increasing the thrust and the sensitivity of the hall sensor.

Next, one of technical problems of the embodiments is, when implementing AF or Zoom, to provide a camera actuator capable of preventing a magnetic field interference between magnets mounted on each lens assembly when a plurality of lens assemblies are driven by an electromagnetic force between a magnet and a coil, and a camera module including the same.

In addition, one of the technical problems of the embodiments is to provide a camera actuator capable of preventing detachment of a magnet and a yoke, and a camera module including the same.

Hereinafter, a prevention structure of magnetic field interference of an embodiment will be described with reference to FIGS. 26A to 26C.

Next, FIG. 26A is a perspective view of a first driving unit 116 of a camera module according to an embodiment.

Referring to FIG. 26A, in the embodiment, the first driving unit 116 may include a first magnet 116*b* and a first yoke 116*a*, and the first yoke 116*a* may include a first support portion 116*a*1 and a first side protruding portion 116*a*2 extending from the first support portion 116*a*1 toward a side surface of the first magnet 116*b*.

The first side protruding portion 116*a*2 may be disposed on both side surfaces of the first magnet 116*b*.

In addition, the first yoke 116*a* may include a first fixed protruding portion 116*a*3 extending in a different direction, for example, in a direction opposite to the first side protruding portion 116*a*2.

The first fixed protruding portion 116*a*3 may be disposed at a position about a middle of the first support portion 116*a*1, but the embodiment is not limited thereto.

Similarly, in the embodiment, the second driving unit 126 may include a second magnet 126*b* and a second yoke 126*a*, and the second yoke 126*a* may include a second support portion (not shown) and a second side protruding portion extending from the second support portion toward a side surface of the second magnet 126*b* (hereinbefore, see a structure of the second yoke 126*a* in FIG. 24).

The second side protruding portion may be disposed on both side surfaces of the second magnet 126*b*. In addition, the second yoke 126*a* may include a second fixed protruding portion (not shown) extending in a different direction, for example, in a direction opposite to the second side protruding portion. The second fixed protruding portion may be disposed at a position about a middle of the second support portion, but the embodiment is not limited thereto.

In the related art, in addition, when implementing AF or Zoom, a plurality of lens assemblies are driven by an electromagnetic force between a magnet and a coil, and there is a problem that a magnetic field interference occurs between magnets mounted in each lens assembly. There is a problem that AF or Zoom driving is not performed normally, and thrust is deteriorated due to such a magnetic field interference between magnets.

In addition, there is a problem that a decent or tilt phenomenon due to a magnetic field interference between magnets is induced.

When an issue in a precision in camera control occurs or thrust is deteriorated due to such a magnetic field interference, or a decent or tilt phenomenon is induced, it may be directly related to the safety or life of a driver who is a user or pedestrian.

For example, FIG. 26B shows data of a magnetic flux density distribution in Comparative Example.

Comparative Example of FIG. 26B is a non-disclosed internal technology of an applicant, and has a structure applied so as to perform a shielding function of magnetic flux by disposing a back yoke for a magnet. A shielding performance of the magnetic flux is improved by applying back yoke technology for the magnet, but there are technical problems as follows.

For example, referring to FIG. 26B, it is magnetic flux density data between respective magnets mounted in the first lens assembly and the second lens assembly, and thus there is a problem that magnetic field interference (IF) occurs between the respective magnets, and loss of thrust occurs due to leakage (LE) of the magnetic flux generated in each magnet.

In particular, in case of a high-magnification Zoom Actuator applied recently, there is a problem that not only magnetic field interference occurs between permanent magnets of the first lens assembly and the second lens assembly, which are moving lenses, but also the magnetic field interference (IF) with a magnet of the OIS actuator occurs.

Movement of each croup is disturbed due to the magnetic field interference (IF), and as a result, there is a problem that an input current is also increased.

According to the embodiment, a yoke in a magnet driving unit of the first lens assembly 110 or the second lens assembly 120 includes a side protruding portion extending to a side surface of the magnet, and thus there is a special technical effect that it is possible to provide a camera actuator capable of preventing a magnetic field interference between magnets mounted on each lens assembly when a plurality of lens assemblies are driven by an electromagnetic force between a magnet and a coil when AF or Zoom is implemented, and a camera module including the same.

For example, FIG. 26C shows data of a magnetic flux density distribution in Example.

Referring to FIG. 26C, it is magnetic flux density data between respective magnets mounted in the first lens assembly and the second lens assembly, and a yoke in a magnet driving unit of the first lens assembly 110 and the second lens assembly 120 includes a side protruding portion extending to a side surface of the magnet, and thus the precision of camera control is improved significantly.

In addition, according to the embodiment, the yoke in the magnet driving unit of the first lens assembly 110 or the second lens assembly 120 includes the side protruding portion extending to the side surface of the magnet to prevent leakage flux generated in the magnet, and the side protruding portion is disposed in a region having a high magnetic flux density so that the magnetic flux is concentrated (FC), and thus there is a technical effect that thrust is significantly improved by increasing a density between a flux line and the coil to increase the Lorentz Force.

Next, FIG. 27 is an illustrative view of an integrated body 315 of a camera module according to another embodiment.

A first camera actuator 100 may be disposed in a first body region 315a of the integrated body 315 of the camera module according to another embodiment, and a second camera actuator 300 may be disposed in a second body region 315b.

Next, FIG. 28 shows a mobile terminal 1500 to which a camera module according to an embodiment is applied.

As shown in FIG. 28, the mobile terminal 2500 according to the embodiment may include a camera module 2000, a flash module 2530, and an autofocus device 2510 provided on a back surface.

The camera module 2000 may include an image capturing function and an autofocus function. For example, the camera module 2000 may include an autofocus function using an image.

The camera module 2000 processes a still image or a moving image frame obtained by an image sensor in a photographing mode or a video call mode. The processed image frame may be displayed on a predetermined display unit, and may be stored in a memory. A camera (not shown) may be disposed on a front surface of the body of the mobile terminal.

For example, the camera module 2000 may include a first camera module 2000A and a second camera module 2000B, and OIS may be implemented together with an AF or zoom function by the first camera module 2000A.

The flash module 2530 may include a light-emitting device that emits light therein. The flash module 2530 may be operated by a camera operation of a mobile terminal or by user control.

The autofocus device 2510 may include one of packages of a surface emitting laser element as a light-emitting unit.

The autofocus device 2510 may include an autofocus function using a laser. The autofocus device 2510 may be mainly used in a condition in which an autofocus function using an image of the camera module 2000 is deteriorated, for example, in a close environment of 10 m or less or a dark environment. The autofocus device 2510 may include a light-emitting unit including a vertical cavity surface emitting laser (VSEL) semiconductor device, and a light receiving unit that converts light energy into electric energy such as a photodiode.

Next, FIG. 29 is a perspective view of a vehicle 3000 to which a camera module according to an embodiment is applied.

For example, FIG. 29 is an appearance view of a vehicle having a vehicle driving assistance device to which a camera module according to the embodiment is applied.

Referring to FIG. 29, the vehicle 3000 according to the embodiment may include wheels 13FL and 13FR that rotate by a power source, and a predetermined sensor. The sensor may be a camera sensor 4000, but the embodiment is not limited thereto.

The camera 4000 may be a camera sensor to which the camera module according to the embodiment is applied.

The vehicle 3000 according to the embodiment may acquire image information through the camera sensor 4000 that photographs a front image or a surrounding image, and may determine an unidentified situation of a lane by using the image information and generate a virtual lane at the time of unidentification.

For example, the camera sensor 4000 may acquire the front image by photographing a front of the vehicle 3000, and a processor (not shown) may acquire the image information by analyzing an object included in the front image.

For example, when an object such as a lane, a neighboring vehicle, a traveling obstacle, and a median strip, a curb, and a street tree corresponding to an indirect road marking is photographed in an image photographed by the camera sensor 4000, the processor detects such an object to include in the image information.

In this case, the processor may acquire distance information with the object detected through the camera sensor 4000 to further complement the image information. The image information may be information about an object captured in the image.

Such a camera sensor 4000 may include an image sensor and an image processing module. The camera sensor 4000 may process a still image or moving image obtained by the image sensor (e.g., CMOS or CCD). The image processing module may process the still image or moving image acquired through the image sensor to extract necessary information, and may transmit the extracted information to the processor.

At this time, the camera sensor 4000 may include a stereo camera so as to improve the measurement accuracy of the object and to secure more information such as a distance between the vehicle 3000 and the object, but the embodiment is not limited thereto.

The characteristics, structures and effects described in the embodiments above are included in at least one embodiment but are not limited to one embodiment. Furthermore, the characteristics, structures, effects, and the like illustrated in each of the embodiments may be combined or modified even with respect to other embodiments by those of ordinary skill in the art to which the embodiments pertain. Thus, it would be construed that contents related to such a combination and such a modification are included in the scope of the present invention.

In addition, embodiments are mostly described above, but they are only examples and do not limit the present invention. A person skilled in the art to which the present invention pertain may appreciate that several variations and applications not presented above may be made without departing from the essential characteristic of the embodiments. For example, each component particularly represented in the embodiments may be varied. In addition, it should be construed that differences related to such a variation and such an application are included in the scope of the present invention defined in the following claims.

What is claimed is:

1. A camera actuator comprising:
    a housing;
    a prism unit disposed in the housing;
    a driving unit for tilting the prism unit;
    a tilting member disposed between the housing and the prism unit to provide a tilting axis for tilting the prism unit; and
    a magnet disposed on the housing,
    wherein the housing has a first side wall facing the prism unit in an optical axis direction,
    wherein the housing includes a first recess provided at an inner surface of the first side wall and a second recess provided at an outer surface of the first side wall,
    wherein the tilting member is disposed in the first recess of the housing and the magnet is disposed in the second recess, and
    wherein the magnet is disposed farther from the prism unit than the tilting member in the optical axis direction.

2. The camera actuator of claim 1, wherein at least a portion of the magnet overlaps the tilting member in the optical axis direction.

3. The camera actuator of claim 1, wherein the prism unit includes:
    a prism mover having a receiving portion; and
    a prism disposed in the receiving portion of the prism mover, and
    wherein a portion of the tilting member is disposed on the prism mover.

4. The camera actuator of claim 1, wherein an outer surface of the prism unit facing the magnet includes a groove in which the tilting member is disposed.

5. The camera actuator of claim 4, wherein
    the tilting member includes a first portion disposed in the first recess, a second portion disposed in the groove, and a third portion disposed between the first recess and the groove.

6. The camera actuator of claim 1, wherein the prism unit is rotatably provided in at least one of a first direction perpendicular to the optical axis direction and a second direction perpendicular to the first direction and the optical axis direction with respect to the ball bearing as a reference axis.

7. The camera actuator of claim 6, wherein the driving unit includes:
    a first driving unit providing a driving force for rotating the prism unit in the first direction; and
    a second driving unit providing a driving force for rotating the prism unit in the second direction, and
    wherein the first driving unit and the second driving unit are disposed on a first outer surface of the prism unit and a second outer surface facing the first outer surface, respectively.

8. The camera actuator of claim 7,
    wherein the housing includes a second sidewall connected to the first sidewall and overlapping the prism unit in the first direction, and
    wherein the second side wall is provided with a plurality of housing holes spaced apart from each other in the optical axis direction.

9. The camera actuator of claim 8,
    wherein the plurality of housing holes have different sizes.

10. The camera actuator of claim 1, wherein the first recess and the second recess have different sizes.

11. The camera actuator of claim 1, wherein the magnet is fixed and disposed in the second recess of the housing.

12. The camera actuator of claim 1, further comprising a cover member disposed on the housing,
    wherein the magnet is disposed on an inner surface of the cover member facing the second recess.

13. The camera actuator of claim 1, wherein the driving unit includes a driving unit circuit board.

14. A camera actuator comprising:
    a housing;
    a prism unit disposed in the housing;
    a driving unit for tilting the prism unit; and
    a ball bearing,
    wherein the prism unit includes a recess for receiving the ball bearing,
    wherein the housing includes a pulling member for generating electromagnetic attractive force with the ball bearing,
    wherein the prism unit is tilted based on the ball bearing, and
    wherein the ball bearing includes a contact portion in direct contact with the pulling member.

15. The camera actuator of claim 14, wherein the ball bearing is in point contact with the pulling member.

16. The camera actuator of claim 14, wherein the ball bearing is made of a magnetic material, and the pulling member is made of a magnet.

17. The camera actuator of claim 14, wherein the ball bearing is made of a magnet, and the pulling member is made of a magnetic material.

18. The camera actuator of claim 14, wherein the housing includes a housing hole formed on a side portion facing the ball bearing,
wherein the housing hole includes:
a first portion disposed on an inner surface of the side portion of the housing; and
a second portion connected to the first portion and disposed on an outer surface of the side portion,
wherein at least a part of the ball bearing is disposed in the first portion, and
wherein the magnet is disposed in the second portion.

* * * * *